US012801333B2

(12) United States Patent
Zhang et al.

(10) Patent No.: US 12,801,333 B2
(45) Date of Patent: Nov. 17, 2026

(54) DISPLAY DEVICE, EXTERNAL DEVICE, AND AUDIO PLAYING AND SOUND EFFECT PROCESSING METHOD

(71) Applicant: HISENSE VISUAL TECHNOLOGY CO., LTD., Qingdao (CN)

(72) Inventors: Huijuan Zhang, Qingdao (CN); Haocheng Yu, Qingdao (CN); Yuanyuan Cao, Qingdao (CN); Jiande Wei, Qingdao (CN)

(73) Assignee: HISENSE VISUAL TECHNOLOGY CO., LTD., Qingdao (CN)

( * ) Notice: Subject to any disclaimer, the term of this patent is extended or adjusted under 35 U.S.C. 154(b) by 211 days.

(21) Appl. No.: 18/749,368

(22) Filed: Jun. 20, 2024

(65) Prior Publication Data

US 2024/0338166 A1 Oct. 10, 2024

Related U.S. Application Data

(63) Continuation of application No. PCT/CN2022/135925, filed on Dec. 1, 2022.

(30) Foreign Application Priority Data

Feb. 25, 2022 (CN) ......................... 202210177319.6
Feb. 25, 2022 (CN) ......................... 202210177868.3

(51) Int. Cl.
*G06F 3/16* (2006.01)

(52) U.S. Cl.
CPC ..................................... *G06F 3/16* (2013.01)

(58) Field of Classification Search
CPC ........ G06F 3/16; G06F 3/165; H04N 21/4363
See application file for complete search history.

(56) References Cited

U.S. PATENT DOCUMENTS 10,705,793 B1 * 7/2020 Young ..................... G10L 15/22
2015/0163450 A1 6/2015 Miyoshi
(Continued)

FOREIGN PATENT DOCUMENTS

CN 1893547 A 1/2007
CN 103716550 A 4/2014
(Continued)

OTHER PUBLICATIONS

The World Intellectual Property Organization (WIPO) International Search Report for PCT/CN2022/135925 Jan. 18, 2023 5 Pages (including translation).

(Continued)

*Primary Examiner* — Stella L. Woo
(74) *Attorney, Agent, or Firm* — ANOVA LAW GROUP, PLLC

(57) ABSTRACT

Provided in the disclosure are a display apparatus and a sound processing method thereof. The method includes: obtaining a control instruction for outputting an audio signal; in response to the control instruction, detecting a current audio output mode, the audio output mode including a normal mode and/or a low-latency mode; receiving audio data from a first external device in connection with the display apparatus via an external device interface, where a data format of the audio data is determined according to the audio output mode; based on that the audio output mode is the low-latency mode, performing a first type of sound effect processing on the audio data; and based on that the audio output mode is the normal mode, performing a second type of sound effect processing on the audio data.

18 Claims, 17 Drawing Sheets

(56) References Cited

U.S. PATENT DOCUMENTS

| | | | | |
|---|---|---|---|---|
| 2017/0047076 | A1 | 2/2017 | Shi et al. | |
| 2021/0243491 | A1* | 8/2021 | Kraegeloh | H04N 21/485 |
| 2021/0280199 | A1 | 9/2021 | Maniskas et al. | |
| 2021/0360235 | A1* | 11/2021 | Yang | H04N 19/70 |
| 2023/0297324 | A1* | 9/2023 | Yu | H04R 3/12 700/94 |

FOREIGN PATENT DOCUMENTS

| | | | |
|---|---|---|---|
| CN | 104240738 | A | 12/2014 |
| CN | 110096250 | A | 8/2019 |
| CN | 111885415 | A | 11/2020 |
| CN | 112669859 | A | 4/2021 |
| CN | 113099428 | A | 7/2021 |
| CN | 113176869 | A | 7/2021 |
| CN | 113727179 | A | 11/2021 |
| CN | 114006890 | A | 2/2022 |
| JP | 2010183624 | A | 8/2010 |

OTHER PUBLICATIONS

China National Intellectual Property Administration (CNIPA) Office Action 1 for 202210177319.6. Mar. 8, 2024 22 Pages (including translation).

China National Intellectual Property Administration (CNIPA) Office Action 1 for 202210177868.3. Feb. 22, 2024 11 Pages (including translation).

* cited by examiner

DISPLAY DEVICE, EXTERNAL DEVICE, AND AUDIO PLAYING AND SOUND EFFECT PROCESSING METHOD

CROSS REFERENCE TO RELATED APPLICATIONS

This application a continuation application of International Application No. PCT/CN2022/135925, filed on Dec. 1, 2022, which claims priorities from Chinese Patent Application No. 202210177319.6 filed on Feb. 25, 2022, and Chinese Patent Application No. 202210177868.3 filed on Feb. 25, 2022, which are hereby incorporated by reference in their entireties.

TECHNICAL FIELD

The disclosure relates to the technical field of display apparatuses, and in particular to a display apparatus, an external device, an audio playback and a sound effect processing method.

BACKGROUND

A display apparatus refers to a terminal device that can output a specific image, which can be based on Internet application technology, has an open operating system and controller, and has an open application platform that can realize two-way human-computer interaction functions, integrating audio-visual, entertainment, data, etc. TV products with multiple functions in one, which are used to meet the diverse and individual needs of users.

The display apparatus can be provided with an external device interface, and the display apparatus can be connected to an external device through the external device interface to receive audio and video data sent from the external device and play the audio and video data. For example, the display apparatus can be provided with a high-definition multimedia interface (HDMI), and external devices such as a host computer can be connected to the display apparatus through an HDMI port, and output the game image to the display apparatus, so as to utilize the large screen of the display apparatus to display the game picture, to obtain a better game experience.

In a game mode, the display apparatus needs to reduce the display delay of an image, that is, enter the low-latency mode of the image, so that the display image can quickly respond to a game operation from a user. However, since the game sound requires specific sound processing in the game mode, after the low-latency mode is enabled on the display apparatus, the sound lags behind the image, resulting in a problem of out-of-synchronization sound and image.

SUMMARY

The disclosure provides a display apparatus, including: a display configured to display an image and/or a user interface, one or more external device interfaces configured to connect with one or more external devices, and one or more processors in connection with the display and the one or more external device interfaces, and configured to execute instructions to cause the display apparatus to: obtain a control instruction for outputting an audio signal; in response to the control instruction, detect a current audio output mode; where the audio output mode includes a normal mode and/or a low-latency mode; receive audio data from a first external device in connection with the display apparatus; where a data format of the audio data is determined according to the audio output mode; based on that the audio output mode is the low-latency mode, perform a first type of sound effect processing on the audio data; and based on that the audio output mode is the normal mode, perform a second type of sound effect processing on the audio data; where processing time of the second type of sound effect processing is greater than processing time of the first type of sound effect processing.

The disclosure further provides a sound processing method for a display apparatus, including: obtaining a control instruction for outputting an audio signal; in response to the control instruction, detecting a current audio output mode, where the audio output mode includes a normal mode and/or a low-latency mode; receiving audio data from a first external device in connection with the display apparatus via an external device interface, where a data format of the audio data is determined according to the audio output mode; based on that the audio output mode is the low-latency mode, performing a first type of sound effect processing on the audio data; and based on that the audio output mode is the normal mode, performing a second type of sound effect processing on the audio data. Processing time of the second type of sound effect processing is greater than processing time of the first type of sound effect processing.

DETAILED DESCRIPTION

In order to make the purposes, implementations and advantages of the embodiments of the disclosure clearer, the embodiments of the disclosure will be clearly and completely described below with reference to specific embodiments of the disclosure and corresponding drawings. Obviously the described embodiments are merely some embodiments of the disclosure but not all the embodiments.

It should be noted that the brief description of the terms in the disclosure is only for the convenience of understanding the implementations described below, and is not intended to limit the implementations of the disclosure. Unless otherwise stated, these terms should be understood according to their ordinary and usual meaning.

A display apparatus according to some embodiments of the disclosure may have various implementations, such as a television, a laser projection device, a monitor, an electronic bulletin board, an electronic table, etc.

Figure 1:
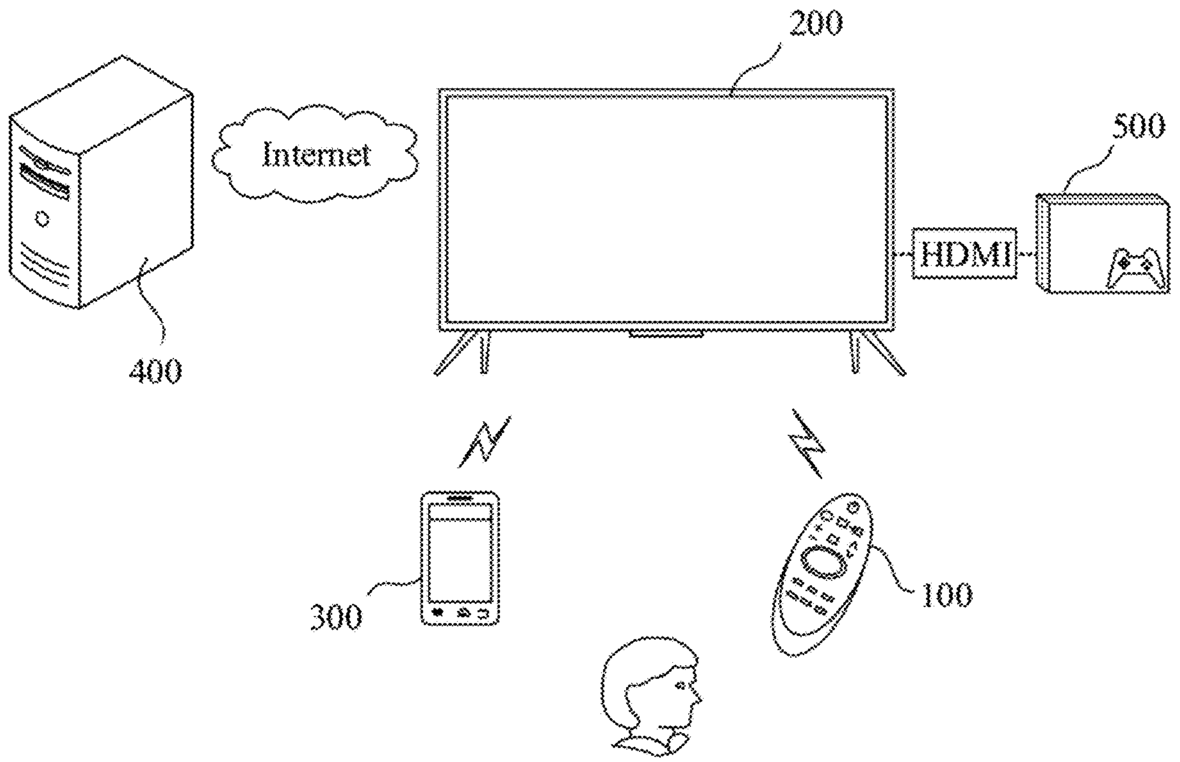
FIG. 1 is a schematic structural diagram of a use scenario of a display apparatus according to some embodiments of the disclosure.

FIG. 1 is a schematic diagram of a use scenario between a display apparatus and a control device according to some embodiments of the disclosure. As shown in FIG. 1, a user can operate a display apparatus 200 through a control apparatus 300 or a control device 100.

In some embodiments, the control device 100 may be a remote controller, and communications between the remote controller and the display apparatus can include infrared communication, Bluetooth communication, and other short-distance communications, and the display apparatus 200 can be controlled in a wireless or wired manner. A user can control the display apparatus 200 by inputting user commands through keys on the remote control, voice input, control panel input, and the like.

In some embodiments, the control apparatus 300 (such as a mobile phone, a tablet computer, a computer, a notebook computer, etc.) may also be used to control the display apparatus 200. For example, the display apparatus 200 is controlled using one or more applications running on the control apparatus 300.

In some embodiments, the display apparatus 200 may not use the above-mentioned control apparatus 300 or the control device 100 to receive instructions, but may receive instructions from a user through touch or gestures.

In some embodiments, the display apparatus 200 can also be controlled in a manner other than the control device 100 and the control apparatus 300. For example, the display apparatus 200 can be controlled by directly receiving a voice command from a user through a component inside the display apparatus 200 for obtaining a voice command, or the display apparatus 200 also can be controlled by directly receiving a voice command from a user through a voice control device outside the display apparatus 200.

In some embodiments, the display apparatus 200 can communicate data with a server 400. The display apparatus 200 may be allowed to communicate via a local area network (LAN), a wireless local area network (WLAN), and other networks. The server 400 may provide various contents and interactions to the display apparatus 200. The server 400 may be one cluster, or multiple clusters, and may include one or more types of servers.

Figure 2:
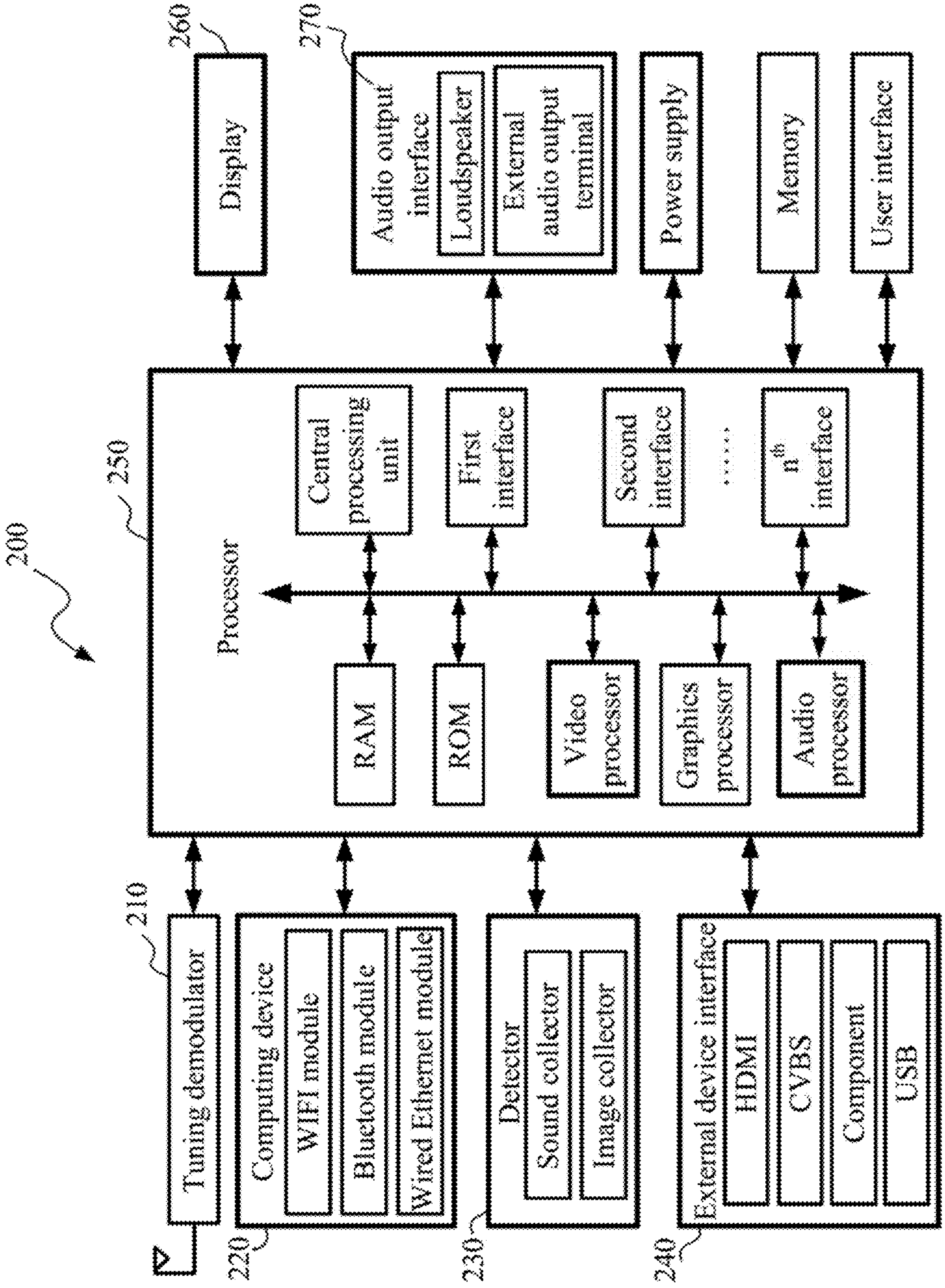
FIG. 2 is a schematic diagram of a hardware configuration of a display apparatus according to some embodiments of the disclosure.

As shown in FIG. 2, the display apparatus 200 may include at least one of a tuning demodulator 210, a computing device 220, a detector 230, an external device interface 240, a processor(s) 250, a display 260, an audio output interface 270, a memory, a power supply, and a user interface.

In some embodiments, the processor(s) 250 may include one or more processors, for example, a video processor, an audio processor, a graphics processor, an RAM, an ROM, and the first to $n^{th}$ interfaces for input and/or output.

The display 260 can include the following components: a display screen component for presenting images; a driving component for driving image display; and a component for receiving image signals output from the processor(s) 250 and displaying a video content, an image content and a menu control interface; and a component for a user interface (UI) for user operations, etc.

The display 260 may be a liquid crystal display, an OLED display, or a projection display. Alternatively, the display 260 can also be a projection device and/or a projection screen.

The computing device 220 can be a component for communicating with external devices or servers according to various types of communication protocols. For example, the computing device may include at least one of a Wifi module, a Bluetooth module, a wired Ethernet module and other network communication protocol chips or near field communication protocol chips, and an infrared receiver. The display apparatus 200 may establish transmission and reception of control signals and data signals with an external control device or the server 400 through the computing device 220.

The user interface can be configured to receive control signals from the control device 100 (such as an infrared remote control, etc.).

The detector 230 can be used to collect signals from an external environment or signals for interacting with an outside. For example, the detector 230 can include a light receiver, and a sensor configured to collect ambient light intensity; or, the detector 230 can include an image collector, such as a camera, which may be configured to collect external environment scenarios, user attributes or user interaction gestures; or, the detector 230 can include a sound collector, such as a microphone, which can be configured to receive external sound.

The external device interface 240 can include, but is not limited to, any one or more of the following interfaces: a high-definition multimedia interface (HDMI), an analog or data high-definition component input interface (component), a composite video broadcast interface (CVBS), a universal serial bus (USB) port, a red, green and blue (RGB) port, etc. It can also be a composite input and/or output interface formed by the above-mentioned multiple interfaces.

The tuning demodulator 210 can receive broadcast television signals in a wireless or wired manner, and demodulates audio and video signals, such as EPG data signals, from multiple wireless or wired broadcast television signals. In some embodiments, the processor(s) 250 and the tuning demodulator 210 may be located in different individual devices. That is, the tuning demodulator 210 may also be in an external device of a main device in which the processor(s) 250 is located, such as an external set-top box.

The processor(s) 250 can control operations of the display apparatus and respond to operations from a user through various software control programs stored in a memory. The processor(s) 250 can control the overall operation of the display apparatus 200. For example, in response to receiving a user command for selecting a UI to-be-displayed object on the display 260, the processor(s) 250 may perform operations associated with the object selected by the user command.

In some embodiments, the processor(s) 250 can include at least one of a central processing unit (CPU), a video processor, an audio processor, a graphics processing unit (GPU), a RAM random access memory (RAM), a read-only memory (ROM), the first interface to the $n^{th}$ interfaces for input and/or output, a communication bus (Bus), and the like.

Figure 3:
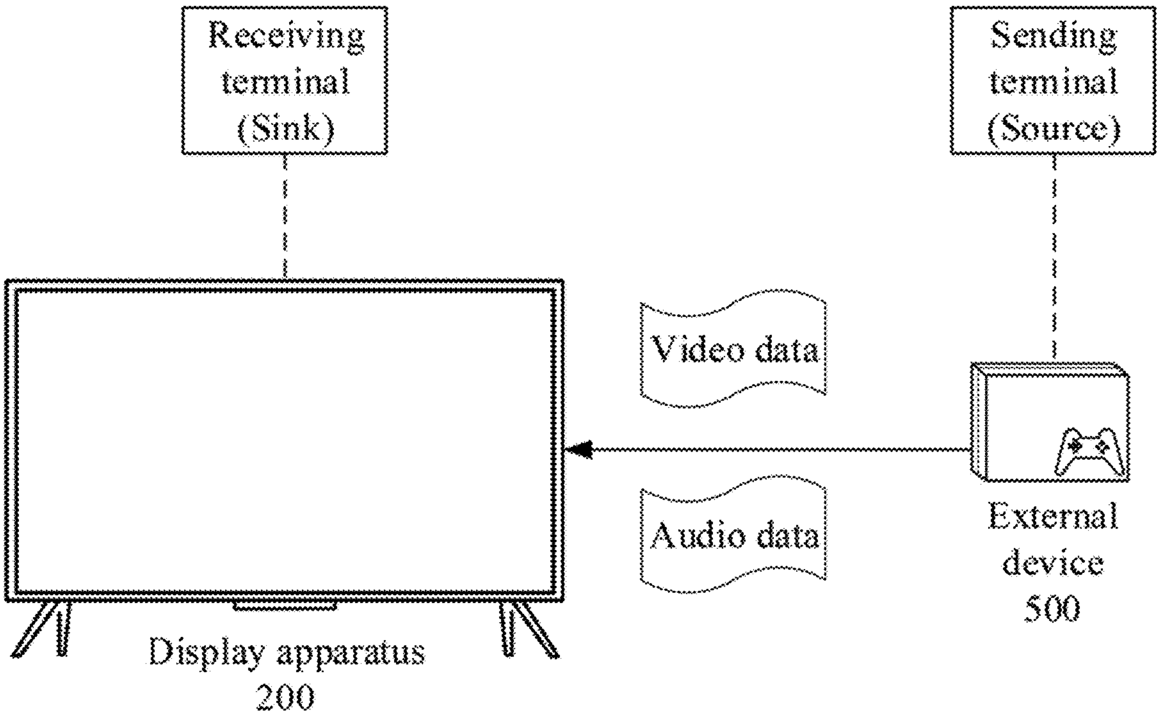
FIG. 3 is a schematic diagram of a connection relationship between a display apparatus and an external device according to some embodiments of the disclosure.

In some embodiments, a connection between a display apparatus 200 and an external device 500 refers to establishing a communication connection, and the display apparatus 200 and the external device 500 that establish the communication connection respectively serve as a receiving terminal (i.e., Sink) and a sending terminal (i.e., Source). For example, as shown in FIG. 3, the external device 500 may be a game device. When a user uses a game device, the game device can output video and audio data in real time for game process, and send the video and audio data to the display apparatus 200, so as to output the video data and the audio data as a video image and sound through the display apparatus 200. At this time, the game device acts as a sending terminal, and the display apparatus 200 acts as a receiving terminal.

Figure 4:
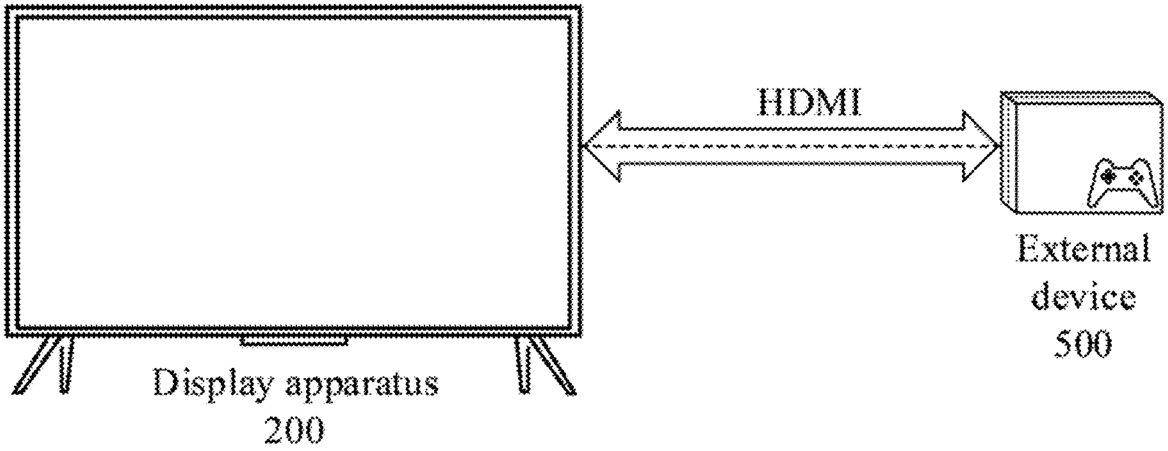
FIG. 4 is a schematic diagram of a connection interface form according to some embodiments of the disclosure.

The communication connection between the sending terminal and the receiving terminal can be realized through a specific interface for transferring data. Thus, both the sending terminal and the receiving terminal should be equipped with data interfaces with the same interface specifications and functions. For example, as shown in FIG. 4, both the display apparatus 200 and the external device 500 are provided with a high-definition multimedia interfaces (HDMI). During use, a user can plug two ends of the HDMI interface data cable into the display apparatus 200 and the external device 500, respectively, and after starting the external device 500 and the display apparatus 200, signal sources of the display apparatus 200 are set to be the HDMI interface, thereby realizing data transmission between the display apparatus 200 and the external device 500.

It should be noted that, in order to realize a communication connection between the display apparatus 200 and the external device 500, other connection manners may also be adopted between the display apparatus 200 and the external device 500. The specific connection manner can be a wired connection method, such as a digital visual interface (DVI), a video graphics array (VGA), a universal serial bus (USB), etc. The specific connection manner can also be a wireless connection method, such as wireless LAN, Bluetooth connection, infrared Connection etc. Different communication connection manners may adopt different information transfer protocols, for example, when an HDMI interface can be used for connection, an HDMI protocol may be used for data transmission.

The data transferred between the display apparatus 200 and the external device 500 may be audio and video data. For example, the display apparatus 200 may be connected with a game device such as a game box through the HDMI interface. When a user performs game operations, the game device can output video data and audio data by running applications that is related to the game. Video data and audio data can be sent to the display apparatus 200 through the HDMI protocol, and output through a screen and speakers of the display apparatus 200 to play the video and audio of the game device.

Figure 5:
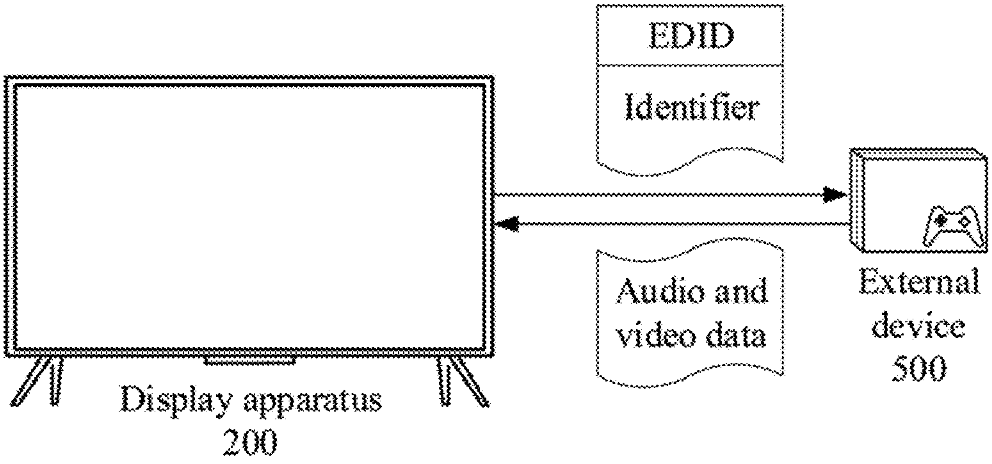
FIG. 5 is a schematic flowchart of obtaining audio and video data according to an identifier according to some embodiments of the disclosure.

After an external device is connected with the display apparatus 200, the external device can transmit data according to specific protocols, so that the display apparatus 200 and the external device 500 can identify each other and establish a data transmission channel. For example, as shown in FIG. 5, according to the transmission rules specified by an HDMI protocol, the display apparatus 200 can establish a connection with the external device 500 based on extended display identification data (EDID) and realize mutual identification and control.

In some embodiments, the display apparatus 200 can send an audio and video data decoding function that is currently supported by itself to the external device 500 through the EDID, so that the external device 500 can send audio and video data according to the support of the display apparatus 200 for the audio and video data decoding function. For ease of description, in some embodiments of the disclosure, the audio data and video data sent from the external device 500 to the display apparatus 200 may be collectively referred to as audio and video data. Obviously, the audio and video data are generated by the external device 500 by running one or more specific applications. For example, when the external device 500 is a game device, the video data corresponds to a game image and the audio data corresponds to game sound effects. The game image can be sent to the display apparatus 200 in the form of video data, and the game sound effects can be sent to the display apparatus 200 in the form of audio data.

In addition to transmitting video data and audio data, the established data transmission channel can also be used to transmit identification information. The identification information may include an identifier of the display apparatus 200 and an identifier of the external device 500. For example, the external device 500 may receive EDID information sent from the display apparatus 200 while sending the video data and audio data to the display apparatus 200. After receiving the EDID information, the external device 500 can read the identifier of the current display apparatus 200 from the EDID information, so as to determine an audio and video decoding function supported by the display apparatus 200 through the identifier.

Obviously, display apparatuses 200 with different hardware configurations support different audio and video decoding capabilities. For example, for audio data, when the display apparatus 200 has an independent audio processing chip, audio data sent from the external device 500 can be decoded by the audio processing chip, and the digital theater system (DTS), the Dolby and other sound effects processing can be performed. For a display apparatus 200 without an independent audio processing chip, audio pulse code modulation (PCM) data or linear pulse code modulation (LPCM) data is generally obtained, and the audio is directly output after decoding.

For some of external devices connected with the display apparatus, since quick respond to images and sounds is needed during use, the display apparatus can provide a low-latency mode when the external devices are running. For example, when the external device is a game device, and the game device is running an action, shooting, or racing game that requires a fast response speed, the display apparatus should present corresponding changes of a game image and play game sound effects within a very short time after executing game interaction operations. At this time, the display apparatus can enter the low-latency mode, that is, the display apparatus can directly decode and output video data in a bypass manner by turning off some unessential image quality processing programs, to present the video data on a screen of the display apparatus 200 in time. A bypass function is a transmission manner that allows two devices to be directly physically connected through a specific trigger state. After a bypass function connection is established between the two devices, the transmitted data does not need to be packetized. A source device can directly transmit original data to a sink device, thereby improving transmission efficiency.

Figure 6:
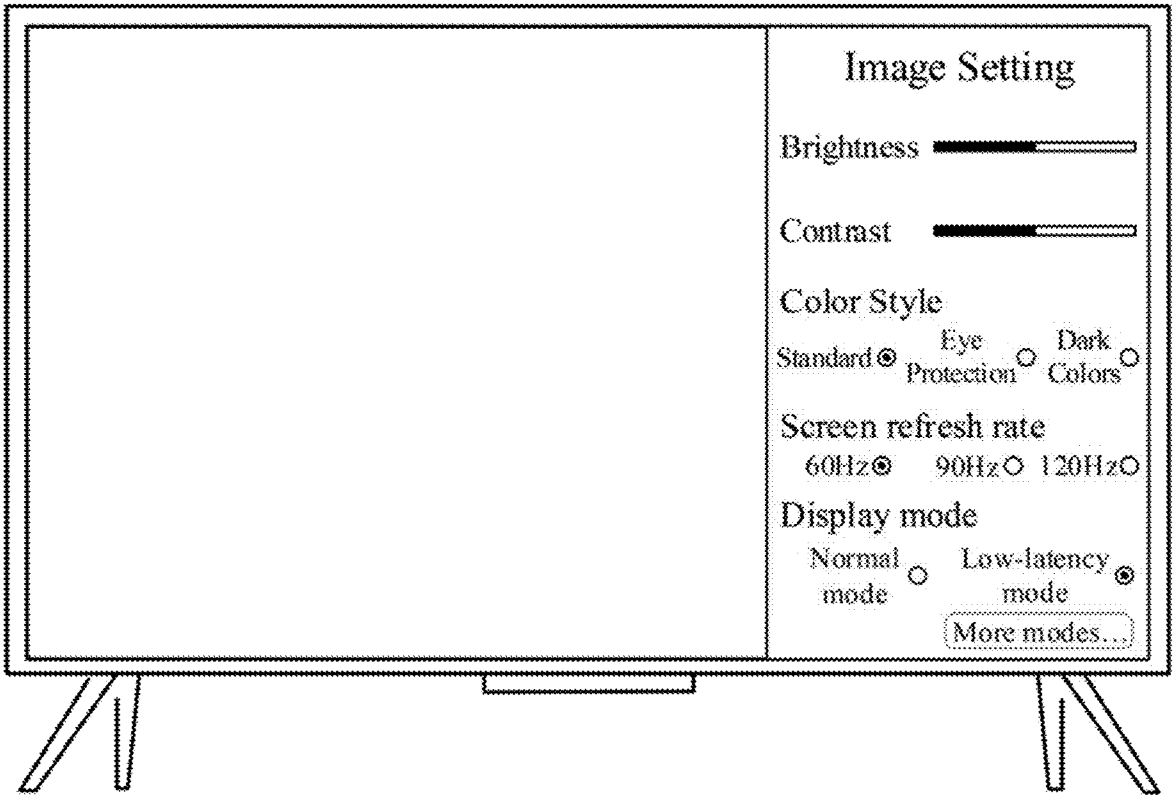
FIG. 6 is a schematic diagram of an image setting interface according to some embodiments of the disclosure.

The low-latency mode can be built into an operating system of the display apparatus 200 as a playing mode for a user to select to enable or disable. For example, an adjusting application in an image mode may be built in an operating system of a display apparatus, and the adjusting application may perform user interaction through a specific mode adjustment interface. That is, as shown in FIG. 6, in a mode adjustment interface, one or more mode options can be set in a control menu, and a user can set an image output mode of the display apparatus by selecting a normal mode option or a low-latency mode option.

Figure 7:
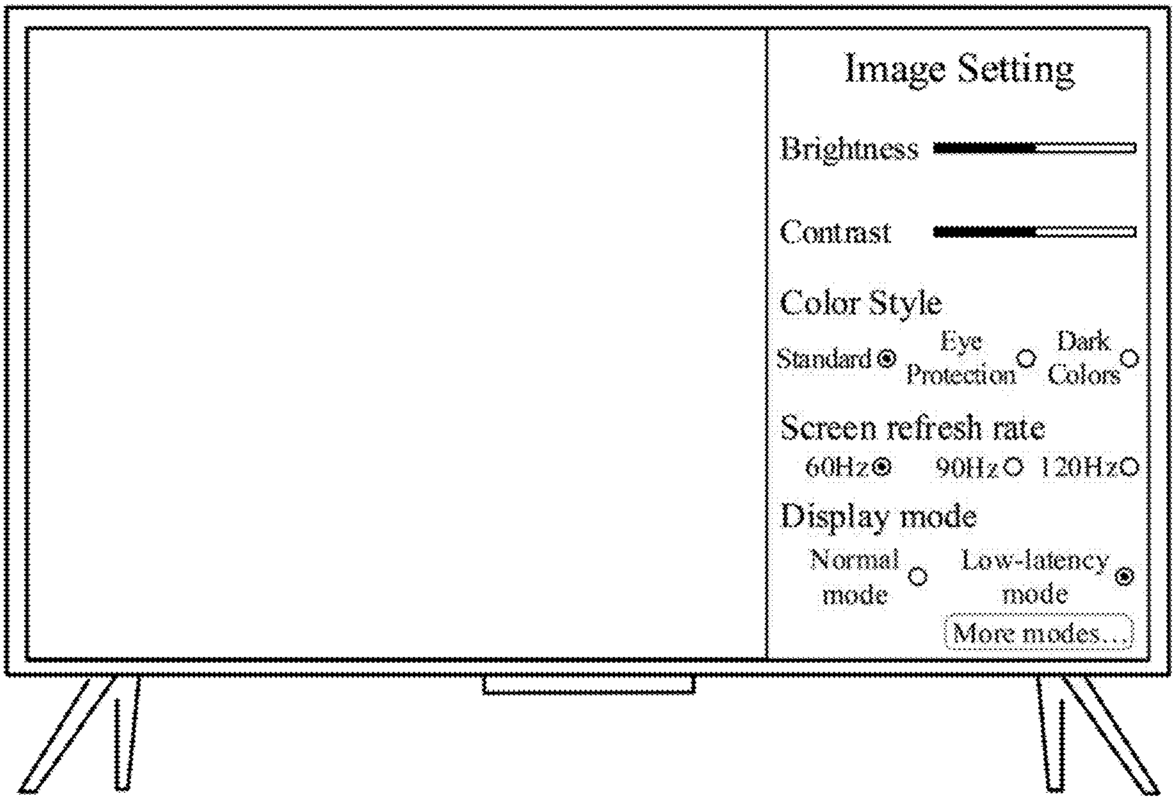
FIG. 7 is a schematic diagram of a display mode menu according to some embodiments of the disclosure.

It should be noted that, a normal mode and a low-latency mode may be set to different specific mode names according to a style of an operating system or a type of the display apparatus 200. For example, as shown in FIG. 7, the normal mode can also be called: a vivid mode (Vivid), a standard mode (Standard), an energy saving mode (Energy Saving), a theater mode including a daytime mode (Theater Day) and a night mode (Theater Night), a Filmmaker mode, etc. The low-latency mode can also be called a game mode (Game), a rapid response mode (Rapid Response), etc.

Figure 8:
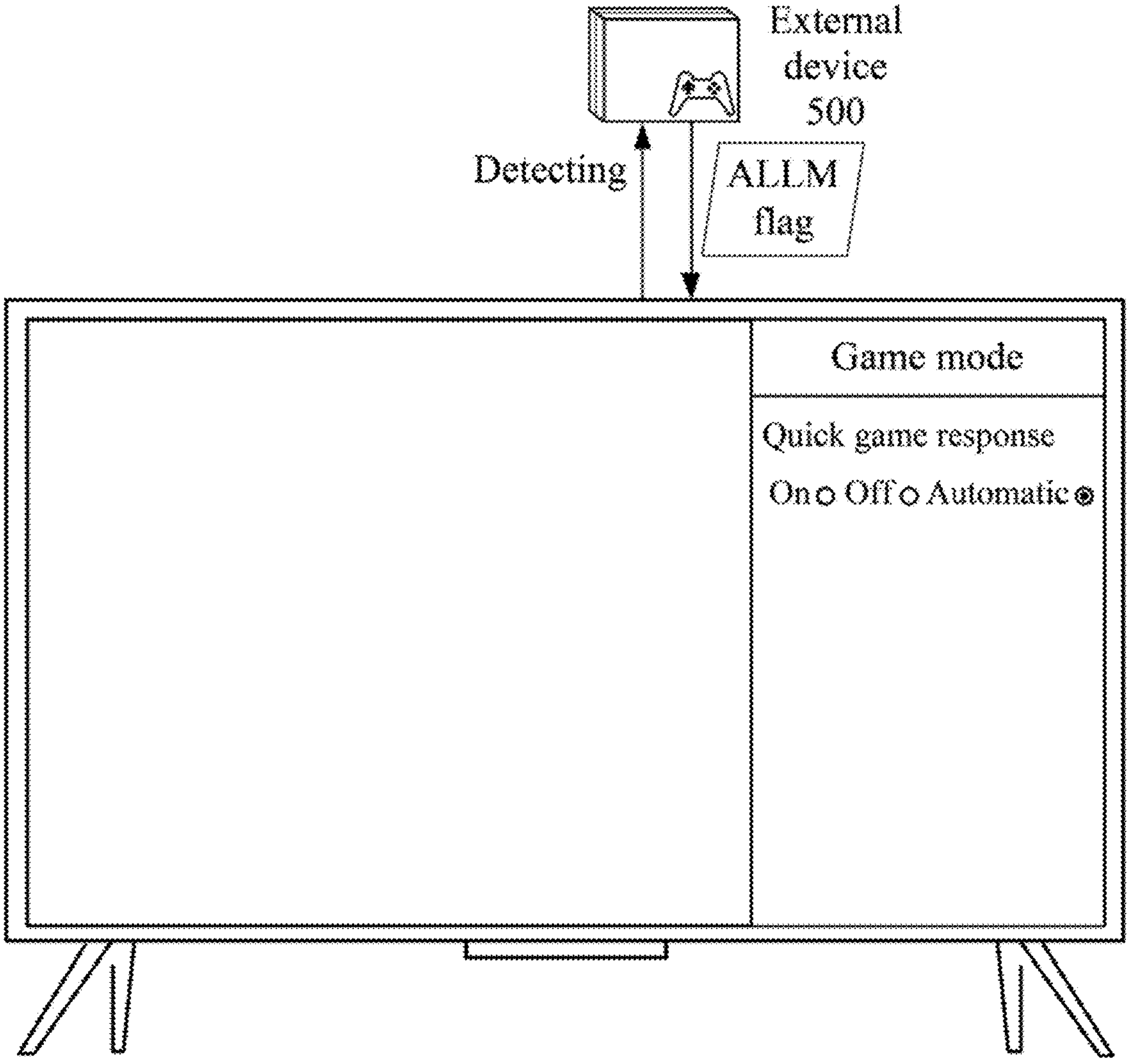
FIG. 8 is a diagram showing an automatic instant game response data transmission relationship according to some embodiments of the disclosure.

In some embodiments, the low-latency mode may be entered in multiple ways. For example, as shown in FIG. 8, a user can select a game mode option to control a display apparatus to enter a low-latency mode through an image mode adjustment interface. A user can also choose to turn on an instant game response switch in a setting interface of the display apparatus, that is, setting the switch to "on" to control the display apparatus to enter the low-latency mode. The user can also set the switch to automatic in the instant game response of the setting interface, that is, Instant Game Response=auto, then when the display apparatus determines that content source information includes an automatic low-latency mode (ALLM) flag, the display apparatus is controlled to enter the low-latency mode.

For the display apparatus 200 that enables a low-latency mode, the display apparatus 200 can quickly complete image rendering and control a time difference between a user interaction operation and image presentation within a reasonable delay time. When displaying different types of images, requirements for image delay are also different. For example, when a game device displays shooting, action and other game screens, a time difference between an interaction operation and image presentation is generally required to be less than or equal to 16 ms, to ensure real-time response to the game image and improve user's gaming experience. When displaying images of casual games, a time difference between an interaction operation and image presentation is allowed to be less than or equal to 100 ms.

Since a sound effect processing module may be built in some display apparatuses 200, the sound effect processing module can process audio data received by the display apparatus 200 and adjust some parameters in the audio data to obtain sound effects suitable for specific scenes. These sound effect processing processes will also consume a certain amount of time, causing the problem of audio and video being out of synchronization. For example, when an image mode of the display apparatus 200 is in a low-latency mode, video data is output through a bypass manner to reduce delay time. Accordingly, a processing speed of audio data will be slower than a processing speed of video data, so that a playing time difference between the audio data and the video data is in a range of 120-150 ms, that is, the sound lags the image by about 150 ms, which is obviously beyond the range of human subjective perception.

In order to alleviate the problem of out-of-synchronization of audio and video, in some embodiments, the display apparatus 200 can adopt a "fast wait for slow" principle, delay output of the audio data or video data that has been processed first, and then play the audio data or video data synchronously after the other data has been processed. For example, in the low-latency mode, the display apparatus 200 needs to delay image processing, that is, cache image data and wait for sound data, to achieve synchronization of sound and images.

However, the audio and video synchronization method based on the "fast wait for slow" principle will increase a response time between an interactive action and a display image (or a playing sound effect). For example, the low-latency mode requires an image delay of less than or equal to 16 ms. However, the delay-waiting adjustment in the range of 0-16 ms is of little significance, and cannot effectively alleviate the problem of out-of-synchronization sound and image. And if the waiting time is prolonged, the time for the image delay will exceed 16 ms, and the low-latency effect cannot be achieved. Moreover, the cost of caching images is relatively high in the audio and video synchronization method based on the "fast wait for slow" principle. According to different formats of image data, the memory occupied by each frame of image is different. The higher the format is, the larger the memory is occupied. Taking a 4K video as an example, each frame of the 4K video has a data volume of about 30 MB, then by caching the image data, according to a physiological structure of the human eye, the human eye can feel the persistence of vision below 15 frames, so the minimum 8 frames need to be cached, which requires a memory capacity of more than 240M, and cannot be supported by the memory capacity of many display apparatuses.

Figure 9:
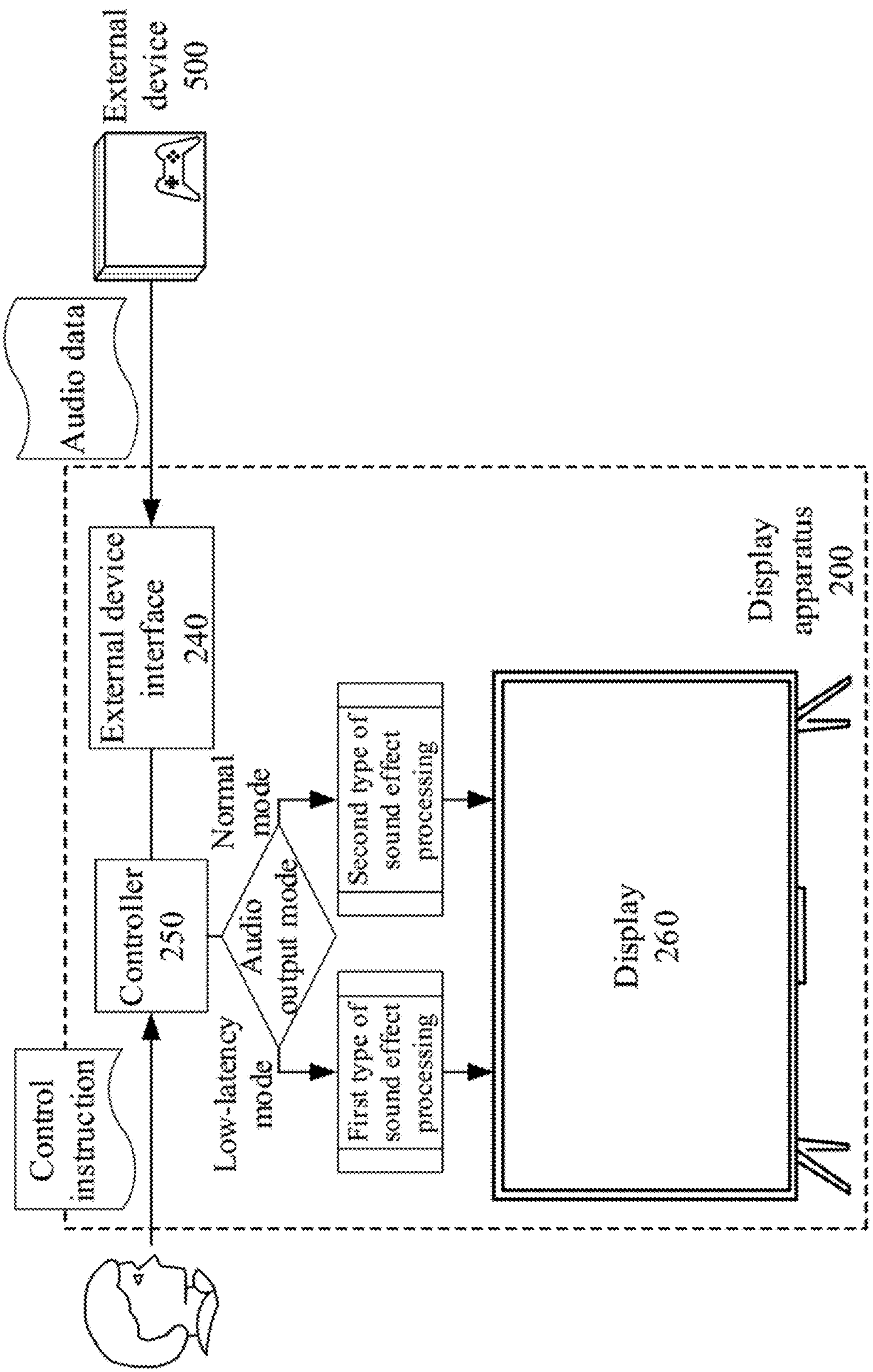
FIG. 9 is a schematic diagram of a sound effect processing flow of a display apparatus according to some embodiments of the disclosure.

In view of the above issues, such as long response time and excessive memory requirements, and out-of-synchronization of audio and video, some embodiments of the disclosure also provide a sound effect processing method, which is applied to the display apparatus 200. In order to implement the sound effect processing method, the display apparatus 200 needs to have certain hardware support. That is, the display apparatus 200 can include a display 260, an external device interface 240, and a processor(s) 250. The display 260 can be used to display an image corresponding to audio data sent from an external device through a user interface, and the external device interface 240 can be used to connect an output module of an external device to obtain audio and video data. As shown in FIG. 9, the processor(s) can be used to execute programs corresponding to the sound effect processing method, and specifically can include the following:

obtaining a control instruction for outputting an audio signal. In embodiments of the disclosure, the control instruction for outputting the audio signal can be a control instruction for controlling the display apparatus 200 to output the audio signal sent from the external device. Therefore, the control instruction for outputting the audio signal may be manually input from a user, or may be automatically generated by the display apparatus 200 through determining a current operating state.

Figure 10:
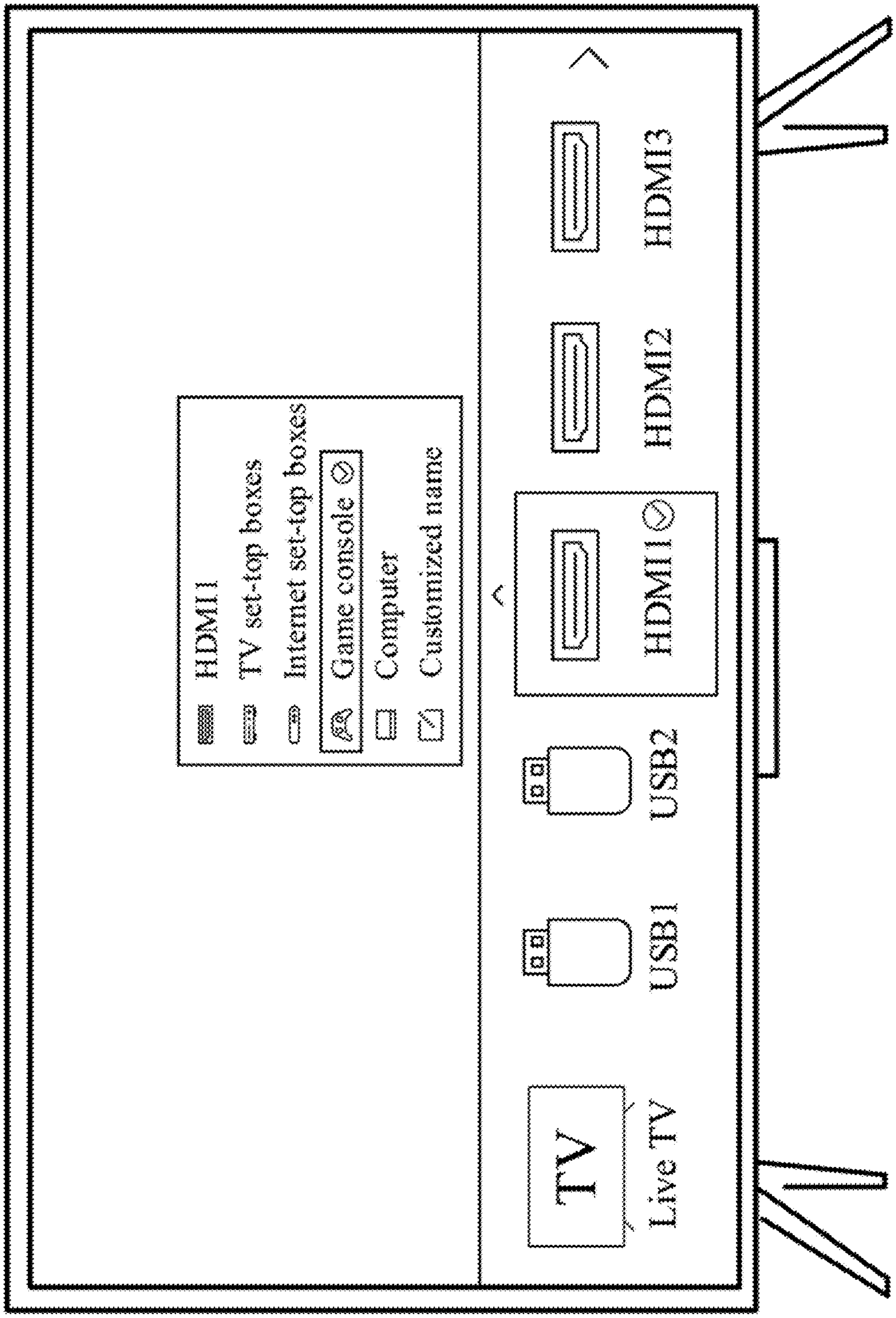
FIG. 10 is a schematic diagram of a signal source switching interface according to some embodiments of the disclosure.

In some embodiments, a user can input a control instruction for outputting an audio signal by switching a signal source of the display apparatus 200 to an external device. For example, when the display apparatus 200 displays a homepage interface, a user can control movement of a focus cursor through one or more direction keys on the control device 100 to select a signal source control in the homepage interface. After the signal source control is selected, the display apparatus 200 can pop up a signal source list window, which can include names of all external devices and network names connected with the display apparatus 200. As shown in FIG. 10, the user then can control the focus cursor to move, when the focus cursor is moved to a position of a "Game Console" option and a confirmation key is pressed, the signal source of the display apparatus 200 is the external device 500, that is, inputting the control instruction for outputting the audio signal.

In some embodiments, a user can also control the display apparatus 200 to switch a signal source through other interactive methods, that is, inputting a control instruction for outputting an audio signal through other interactive methods. For example, a signal source key can be provided on the control device 100, and a user can control the display apparatus 200 to switch to a signal source selection interface on any interface through a signal source key, so as to select an external device as the signal source. For the display apparatus 200 that supports touch interactive operations, a user can select a signal source option through a touch interaction, and select an option corresponding to an external device in a signal source selection interface. In addition, for the display apparatus 200 that supports voice interaction, the display apparatus 200 can be caused to switch a signal source by inputting voice content such as "switch a signal source to a game machine" or "I want to play a game", so as to obtain a control instruction for outputting an audio signal.

In some embodiments, the display apparatus 200 may automatically generate a control instruction for outputting an audio signal when detecting that an external device is connected. For example, during the operation of the display apparatus 200, when a user plugs an external device such as a game box into an HDMI port of the display apparatus 200, since the display apparatus 200 supports hot plug operations, it can detect that there is an external device connected, and the display apparatus 200 can automatically switch a signal source, that is, generate a control instruction for outputting an audio signal. Therefore, receiving audio and video data sent from a game box for playing can be equivalent to the display apparatus 200 obtaining a control instruction for outputting an audio signal.

In addition, the display apparatus 200 can automatically generate a control instruction for outputting an audio signal when detecting audio and video data input from an external device. That is, the display apparatus 200 can monitor data input of each interface in real time, and when any interface has audio and video data input, the display apparatus 200 can be caused to display a prompt interface for prompting a user to switch a signal source. At this time, if the signal source is determined to be switched, the display apparatus 200 generates a control instruction for outputting an audio signal.

After obtaining the control instruction for outputting the audio signal, the display apparatus 200 may detect a current audio output mode in response to the control instruction. Herein, the audio output mode is one of a normal mode or a low-latency mode. The display apparatus 200 in the normal mode can perform sound effect processing on audio data sent from an external device according to a default sound effect processing method, so as to improve audio output quality of the external device. The display apparatus 200 in the low-latency mode can quickly respond to an output operation of an external device, that is, when audio data or video data is received, it can quickly play the data, so as to reduce the delay time of audio output and interactive actions and improve the response speed.

Figure 11:
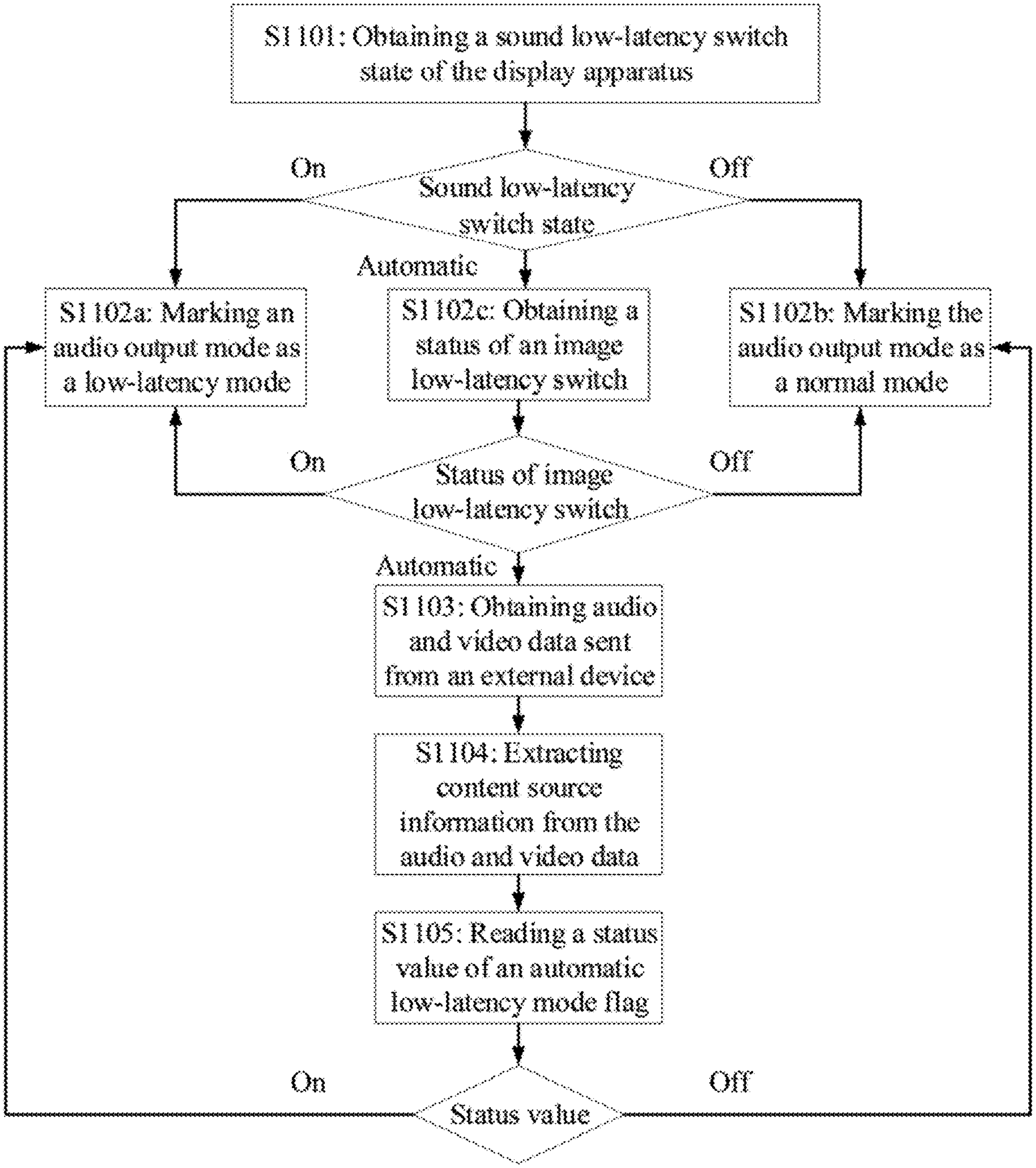
FIG. 11 is a schematic flowchart of detecting an audio output mode according to some embodiments of the disclosure.

Since a user can manually set an audio output mode of the display apparatus 200, the display apparatus 200 can detect a current audio output mode according to a state set by a user. As shown in FIG. 11, in some embodiments, the display apparatus 200 may obtain a sound low-latency switch state of the display apparatus 200 after a user inputs a control instruction for outputting an audio signal. According to settings from the user, the sound low-latency switch state can include one of an on-state, an off-state, and an automatic state. If the sound low-latency switch state is the on-state, it is determined that the audio output mode is the low-latency mode; if the sound low-latency switch state is the off-state, it is determined that the audio output mode is the normal mode.

For example, a user can call up a setting menu interface through keys on the display apparatus 200 or keys on the control device 100 accompanying the display apparatus 200, and can control a focus cursor on a setting menu interface to move through direction keys. When the user moves the focus cursor to a low-latency mode option and presses a "confirmation key", the low-latency mode of the display apparatus 200 is enabled, that is, the sound low-latency switch state is set to an on-state and stored in backup data. At this time, the display apparatus 200 can update the sound low-latency switch state in the backup data.

In some embodiments, if the sound low-latency switch state is the automatic state, a status of an image low-latency switch is obtained, and the current audio output mode is set according to the status of the image low-latency switch. The image low-latency mode and the sound low-latency mode of the display apparatus 200 can be uniformly configured in one mode, that is, the low-latency mode. Then, when the low-latency mode is enabled or disabled, the display apparatus 200 can enable or disable the image low-latency mode and the sound low-latency mode at the same time. The image low-latency mode and the sound low-latency mode can also be two independent modes, and support users to set them separately. For example, the two low-latency modes can be in different setting menus or interfaces, that is, the image low-latency mode option can be in the lower-level menu of an image setting option, and the sound low-latency mode can be in the lower-level menu of a sound setting option.

Therefore, when the sound low-latency switch state is in the automatic state, the display apparatus 200 can first obtain audio and video data sent from an external device, and extract content source information from the audio and video data, where the content source information is informational data content established based on a transmission protocol between a display apparatus and an external device, which can be used to transmit a respective operating status and control instructions of the display apparatus and the external device to achieve collaborative control. That is, the content source information can include an automatic low-latency mode flag. Then the display apparatus 200 can read a status value of the automatic low-latency mode flag. Obviously, the status value is set by the external device according to output requirements of current audio and video data. If the status value is on, the audio output mode is marked as the low-latency mode; if the status value is off, the audio output mode is marked as the normal mode.

For example, a game rapid response can be configured to be automatic state in a setting interface. After the display apparatus 200 reads that the game rapid response is set to the automatic state, it can receive audio and video data sent from an external device and extract content source information from the audio and video data. The content source information may include parameter bits such as a game type, a setting status of a game device, and a transmission protocol. According to the settings of the external device, the setting status of the game device in the content source information may include an ALLM flag. Then the display apparatus 200 can read an ALLM flag bit. If a value of the ALLM flag is a status value indicating that the game device has enabled the automatic low-latency mode, that is, ALLM=true, then it is determined that the external device needs to enable the low-latency mode. Therefore, the display apparatus 200 can automatically enter the low-latency mode, that is, set the sound low-latency switch state to on, and store it in the backup data. Similarly, the display apparatus 200 can update the sound low-latency switch state in the backup data.

After detecting an audio output mode, the display apparatus 200 can receive audio data from an external device, where a data format of the audio data can be determined by the external device according to the audio output mode. That is, in some embodiments, the display apparatus 200 can also send audio output mode to an external device, so that the external device can set a data format of the audio data to be sent according to the audio output mode.

FIG. 11 is a schematic flowchart of detecting an audio output mode in embodiments of the disclosure. The process can include the following steps.

S1101: obtaining a sound low-latency switch state of the display apparatus 200.

If the sound low-latency switch state is an on-state, the flow goes to S1102*a*: marking an audio output mode as a low-latency mode.

If the sound low-latency switch state is an off-state, the flow goes to S1102*b*: marking the audio output mode as a normal mode.

If the sound low-latency switch state is an automatic state, the flow goes to S1102*c*: obtaining a status of an image low-latency switch.

If the status of the image low-latency switch is an on-state, the flow goes to S1102*a*.

If the status of the image low-latency switch is an off-state, the flow goes to S1102*b*.

If the status of the image low-latency switch is an automatic state, the flow goes to S1103: obtaining audio and video data sent from an external device.

S1104: extracting content source information from the audio and video data.

S1105: reading a status value of an automatic low-latency mode flag.

If the status value is on, the flow goes to S1102*a*.

If the status value is off, the flow goes to S1102*b*.

Figure 12:
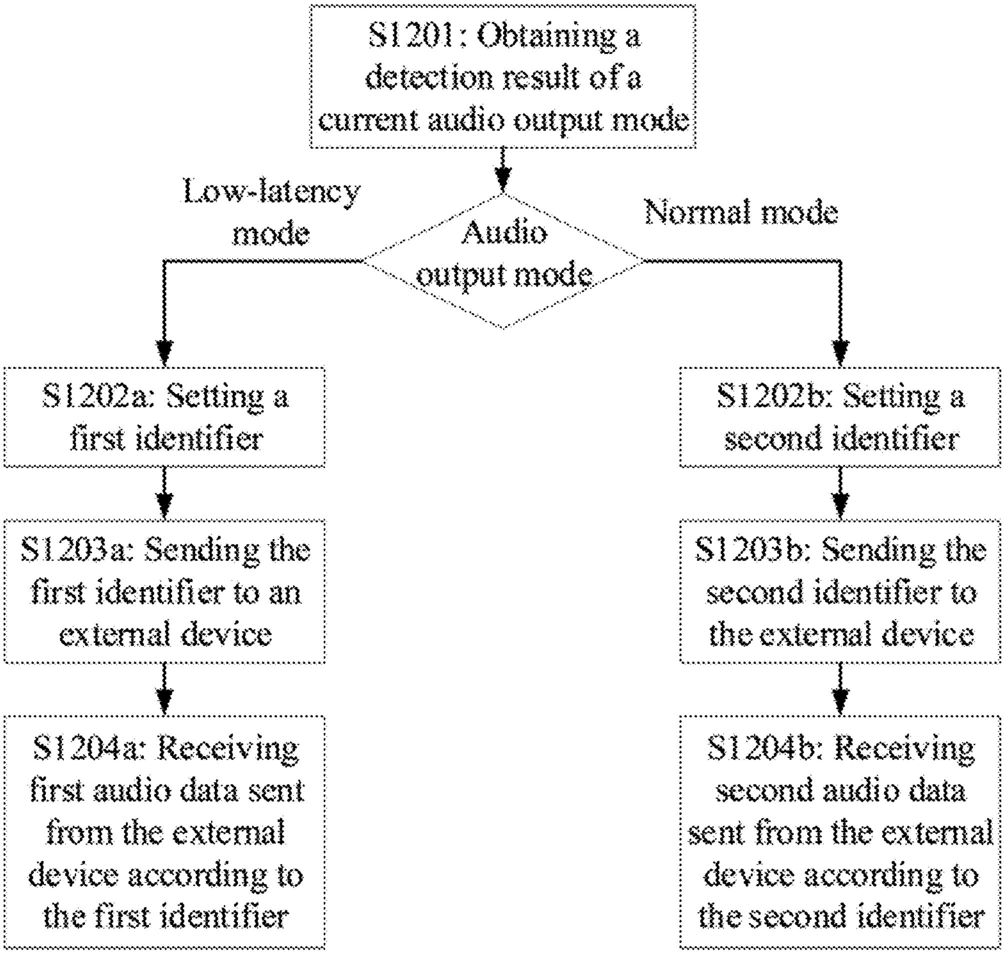
FIG. 12 is a schematic flowchart of receiving audio data according to some embodiments of the disclosure.

As shown in FIG. 12, FIG. 12 is a schematic flowchart of receiving audio data in embodiments of the disclosure. The display apparatus can also perform the following steps.

S1201: obtaining a detection result of a current audio output mode, i.e., determining that the current audio output mode is a normal mode or a low-latency mode.

If the audio output mode is the low-latency mode, the flow may include:

S1202*a*: setting a first identifier;

S1203*a*: sending the first identifier to an external device; and

S1204*a*: receiving first audio data sent from the external device according to the first identifier.

If the audio output mode is the normal mode, the flow may include:

S1202*b*: setting a second identifier;

S1203*b*: sending the second identifier to the external device; and

S1204*b*: receiving second audio data sent from the external device according to the second identifier.

The display apparatus 200 may first obtain a detection result of a current audio output mode, that is, determine that the current audio output mode is the normal mode or the low-latency mode. If the audio output mode is the low-latency mode, the first identifier may be set, where the first identifier can be used to cause the external device to send the first audio data. Then, the first identifier is sent to the external device to cause the external device to send the first audio data adapted to the low-latency mode to the display apparatus 200. Therefore, the display apparatus 200 can receive the first audio data sent from the external device according to the first identifier after sending the first identifier to the external device.

For example, when the external device identifies the display apparatus 200 through EDID, identification data corresponding to the EDID may include parameter bits corresponding to an identifier. The external device can obtain data processing conditions supported by the display apparatus 200 by reading specific data values in the parameter bits. Here, the identifier used to indicate that the current display apparatus 200 supports a first type of sound effect processing such as PCM and LPCM is the first identifier; and the identifier used to indicate that the current display apparatus 200 supports a second type of sound effect processing such as DTS and dobly is the second identifier.

The first type of sound effect processing such as PCM and LPCM has lower requirements for audio data. For example, it only needs to include a content audio or a first type of equalization processing, while the second type of sound effect processing such as DTS and Dobly has higher requirements for audio data, in addition to the content audio, it also required to include sound effect audio such as environmental sound and directional sound, so that a sound effect processing time of the display apparatus 200 for second audio is longer than a sound effect processing time of the display apparatus 200 for first audio, which is not conducive to achieving the low-latency mode. Therefore, in the embodiments, the display apparatus 200 can modify identification data corresponding to the EDID after initiating the low-latency mode, that is, change a data table item used to represent an HDMI RX interface in EDID data to support LPCM formats such as 32 kHz, 44.1 kHz and 48 kHz, so that the parameter bits corresponding to the identifier are set to the first type of sound effects, such as PCM and LPCM, corresponding to the first identifier.

Since identification data where an identifier such as EDID is located is generally sent to an external device in the form of protocol data, in some embodiments, the display apparatus 200 can extract an initial identification configuration file from protocol data corresponding to an external device interface, namely extract a file for recording an identifier when it is not modified to the first identifier. Then an identifier content in the initial identification configuration file is read, if the identifier in the initial identification configuration file is the second identifier, that is to inform the external device that the current display apparatus 200 supports the second type of sound effect processing, and the external device sends audio data adapted to an algorithm of the second type of sound effect processing to the display apparatus 200. At this time, the display apparatus 200 may delete the initial identification configuration file and create an updated identification configuration file. The identifier of the update identification configuration file is the first identifier, that is, to inform the external device that the current display apparatus 200 supports the low-level audio processing. Then, an update identification configuration file is added to the protocol data, so that the external device sends audio data adapted to an algorithm of the first type of sound effect processing to the display apparatus 200.

For example, when the low-latency mode is not enabled and protocol data sent from the display apparatus 200 to an external device can include protocol data whose identifier supports DTS sound effects, the external device can send audio data corresponding to the DTS sound effects to the display apparatus 200. When the display apparatus 200 detects that the low-latency mode has been enabled, the display apparatus 200 can delete the initial identification configuration file in the protocol data, and then create an update identification configuration file whose identifier supports PCM sound effect processing, so that the external device can send PCM audio data to the display apparatus 200, thereby reducing processing time of the audio data by the display apparatus 200.

Similarly, if the current audio output mode of the display apparatus 200 is the normal mode, the second identifier can be set. The second identifier can be used to cause the external device to send second audio data, and the sound effect processing time of the second audio data is greater than the sound effect processing time of the first audio data. The second identifier is then sent to the external device, so as to receive second audio data sent from the external device according to the second identifier.

It can be seen that, in order to adapt to the low-latency mode, the display apparatus 200 can modify the identifier of the display apparatus 200 after detecting that the low-latency mode has been enabled, so that the external device can adjust a data format of transmitted audio according to the identifier of the display apparatus 200, and the display apparatus 200 can receive audio data with a shorter sound effect processing time, to reduce the delay between audio output and user interaction, and to improve audio-video synchronization performance. For example, when an external device sends LPCM audio data to the display apparatus 200, the display apparatus 200 may omit all or part of audio parsing (Audio Parser), decoding (Decoder), and PCM audio sequence (PCM First Input First Output, PCM FIFO) and other links during audio processing, to reduce audio processing time.

In the low-latency mode, since timeliness of an audio signal output from the display apparatus 200 has a greater impact on user experience, after the display apparatus 200 detects that the low-latency mode has been enabled, the display apparatus 200 can further adjust a sound effect processing strategy for audio data, that is, after receiving audio data from the external device, the display apparatus 200 may perform different sound effect processing methods on the received audio data for different audio output modes. If the audio output mode is the low-latency mode, the first type of sound effect processing is performed on the audio data; if the audio output mode is the normal mode, the second type of sound effect processing is performed on the audio data. Obviously, the processing time of the second type of sound effect processing is greater than the processing time of the first type of sound effect processing.

In some embodiments, after receiving the audio data, the display apparatus 200 can decode the received audio data to obtain an audio signal. Then, the display apparatus 200 can call different sound effect processing algorithms to adjust the audio signal according to different audio output modes, that is, the sound effect processing process is started. If the current audio output mode of the display apparatus 200 is the low-latency mode, an algorithm of the first type of sound effect processing can be called, and the audio signal is adjusted according to the algorithm of the first type of sound effect processing; if the current audio output mode of the display apparatus 200 is the normal mode, an algorithm of the second type of sound effect processing can be called, and the audio signal is adjusted according to the algorithm of the second type of sound effect processing to obtain audio data with different sound effects. Finally, the display apparatus 200 can play the adjusted audio signal to complete audio output.

For example, in the low-latency mode, the LPCM data received by the display apparatus 200 also needs some sound effect processing. Here, part of the sound effect processing is the first type of sound effect processing, such as chip-based sound effect processing such as equalization processing, and left and right channel processing. Part of the sound effect processing is the second type of sound effect processing, such as Dolby audio processing and digital theater analog sound processing process (DTS virtual X processing). Since the second type of sound effect processing will prolong output time of the audio data, when it is checked that the current audio output mode is the low-latency mode, the display apparatus 200 can disable the second type of sound effect processing process, that is, disable the Dolby audio process, DTS process, etc., only retaining the chip-based sound effect processing (SOC sound effect) process, to reduce the delay of audio output.

However, in the normal mode, DTS data received by the display apparatus 200 needs to be processed with sound effects, that is, the display apparatus 200 can first decode received audio data of a DTS sound effect to obtain an audio signal. Then the display apparatus 200 calls the second type of sound effect processing process, i.e., DTS virtual X processing, and processes the audio signal through the DTS virtual X processing, so that DTS virtual X processing can process sound effect audio in the audio signal, such as increasing or reducing the volume of some channels, adjusting the timbre, etc., to improve output quality of the audio signal and obtain the theater effect.

Figure 13:
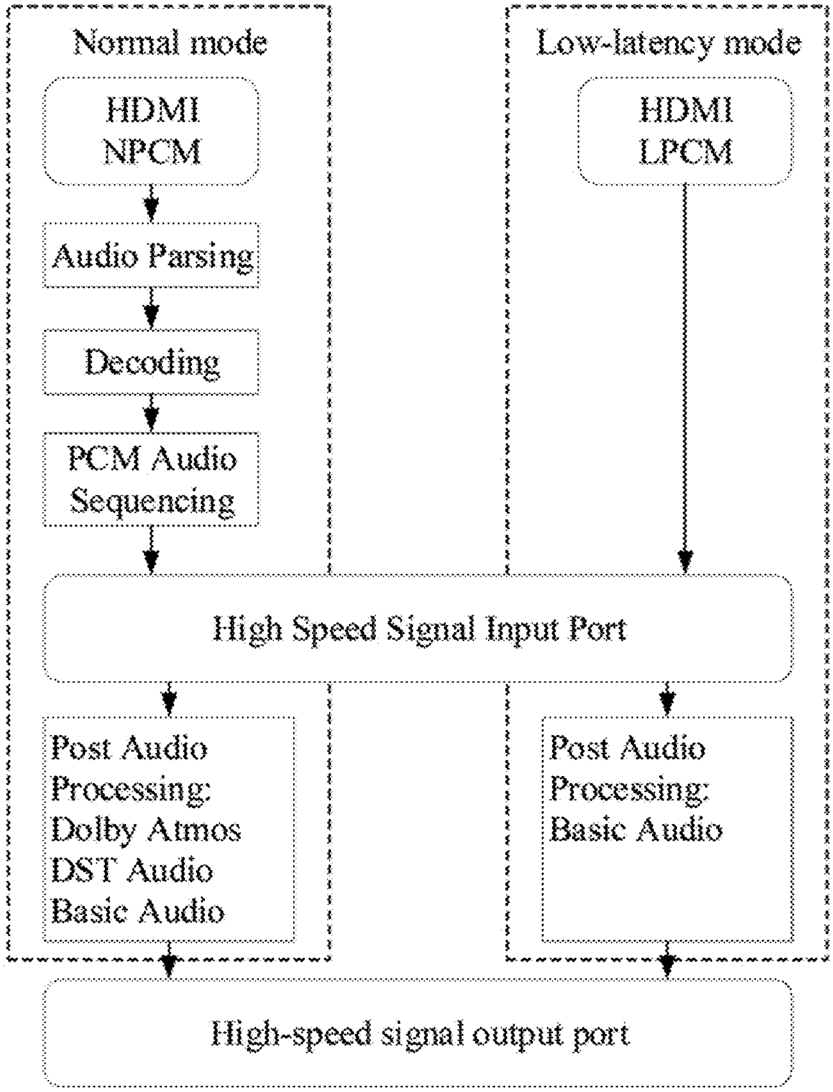
FIG. 13 is a flowchart of audio output in different modes according to some embodiments of the disclosure.

It can be seen that the sound effect processing method according to the above embodiments can obtain audio data in different data formats when the display apparatus 200 is in different audio output modes, and can adopt different sound effect processing methods for the audio data obtained in different sound effect output modes. Therefore, as shown in FIG. 13, in the low-latency mode, the display apparatus 200 may use chip-based audio processing instead of advanced audio processing to further reduce the sound processing time. According to the actual application test, the above-mentioned sound effect processing method is adopted in the low-latency mode, which can keep the sound delay within 50 ms, ensuring that the user's subjective experience of sound and image is synchronized.

The first type of sound effect processing supported by the display apparatus 200 may include multiple sound effect processing items, such as equalization processing, channel processing, etc. For different audio format versions and content source types, the first type of sound effect processing projects required is different. Therefore, in some embodiments, when performing the first type of sound effect processing on audio data, the display apparatus 200 can also further filter processing items in the base sound processing process on the basis of an audio format version, a content source type, and a processing time of each sound effect processing item.

That is, the display apparatus 200 can obtain a set of basic processing items supported currently. The sound effect processing item in the set of basic processing items is a sound effect processing item of the first type of sound effect processing. Then the display apparatus 200 can parse audio data to obtain a current format version of the audio data. Since different audio format versions require different sound effect processing forms, after obtaining the current format version, the display apparatus 200 can filter out an essential sound effect processing item from the set of basic processing items based on the sound effect processing items required by the current format version, and then call a sound effect processing algorithm corresponding to the essential sound effect processing item, and use the sound effect processing algorithm corresponding to the essential sound effect processing item to perform sound effect processing on the audio data.

For example, the first type of sound effect processing for PCM data can include sound effect processing items such as a mono, a dual-channel (Stereo), 5.1-channel and 7.1-channel, which form a set of basic processing items. For lower versions of PCM data, only the mono or the dual-channel sound effects processing is supported, while higher versions of PCM data can support the 5.1-channel and the 7.1-channel sound effects processing. Therefore, after obtaining audio data, the display apparatus 200 parses a PCM version corresponding to the audio data. When the PCM format version is parsed to be a lower version, the display apparatus 200 can filter processing items in the set of basic sound effect processing items to obtain an essential sound effect processing item, namely the mono or dual-channel sound effects, thereby enabling only the mono or dual-channel sound effects processing to perform the first type of sound effect processing on the audio data.

It should be noted that during the process of filtering essential audio processing items, the display apparatus 200 can also detect its own hardware configuration and determine the hardware configuration corresponding to an audio output module. For example, when the display apparatus 200 only has a speaker, audio output only requires a mono signal, so the display apparatus 200 can also filter out mono processing items among essential audio processing items to start the mono processing items to perform sound effect processing on the audio data.

Since audio and video data of different content source types have different requirements for sound effect processing, in some embodiments, the display apparatus 200 can also filter sound effect processing items in a set of basic processing items according to the content source type. The content source type can be used to indicate a type of audio and video data sent from an external device to the display apparatus 200. When an external device is in different operating states, the display apparatus can receive audio and video data of different types. The content source type can be obtained by reading information data of the audio and video data when the display apparatus 200 first obtains the audio and video data, or by performing image processing on the audio and video data and identifying the audio and video data based on an image processing result.

In order to realize a filtering process of sound effect processing items based on the type of content source, the display apparatus 200 can obtain content source information sent from an external device after obtaining a set of basic processing items supported by the current display apparatus. Then the display apparatus 200 reads the current content source type of the external device from the content source information, and filters out an unessential sound effect processing item from a set of basic processing items according to the current content source type, so as to disable a sound effect processing algorithm corresponding to the unessential sound effect processing item.

For example, when an external device is a game device and is running a casual game, since the sound position has little impact on user experience, the display apparatus 200 can only use a mono mode for sound effect processing in order to respond quickly and realize an output of a sound signal. At this time, the dual-channel sound effects processing item, the 5.1-channel sound effects processing item, and the 7.1-channel sound effects processing item are all unessential sound effect processing items for the content source type corresponding to the current casual game. Therefore, the display apparatus 200 can disable these sound effect processing items, and only use the mono mode for sound effect processing to improve sound effect response speed and reduce delay of the audio output.

It should be noted that, in a process of filtering sound effect processing items in a set of basic processing items, the display apparatus 200 can filter based on a format version of audio data only, or only based on a content source type. Alternatively, the display apparatus 200 can also filter based on both a format version of audio data and a content source type. For example, the display apparatus 200 can first filter essential sound effect processing items based on a format version of audio data for selecting. Then, the sound effect processing items suitable for the current content source type are matched from the essential sound effect processing items, so that the final sound effect processing is performed through the sound effect processing items after two filters.

After filtering out the sound effect processing items, if output response time is still within a reasonable range and maintained in a small response delay state, the display apparatus 200 can also further enable a sound effect processing item that can improve the quality of the sound effect and have a smaller impact on output latency, on the basis of the essential sound effect processing items, by enabling an additional sound effect processing item.

In some embodiments, the display apparatus 200 can obtain an average processing duration of each sound effect processing item in a set of basic processing items after obtaining the set of basic processing items currently supported by the display apparatus. The average processing time can be obtained through performance statistics of the display apparatus 200, or can be calculated based on current hardware configuration of the display apparatus 200 and algorithm complexity of each sound effect processing item.

After obtaining the average processing time, the display apparatus 200 can filter out the additional sound effect processing item from the set of basic processing items according to the average processing time, call the sound effect processing algorithm corresponding to the additional sound effect processing item, and use the sound effect processing algorithm corresponding to the additional sound effect processing item to perform sound effect processing on audio data, to improve the sound quality of output audio within an allowable delay range.

The additional sound effect processing item is a sound effect processing item whose average processing duration is less than or equal to a remaining duration threshold. The remaining duration threshold is calculated based on a total duration of an essential sound effect processing item and a preset allowable delay. For example, in the low-latency mode, the maximum delay allowed for sound output is 15 ms, that is, the audio is output within 15 ms after decoding audio data. After filtering based on parameters such as a format version and/or source type of the audio data, the essential sound effect processing items determined are the mono mode sound effect processing. The processing time of the essential sound effect processing items is 5 ms, and the remaining sound effect processing item can be calculated and obtained as 15 ms.

At this time, the display apparatus 200 can determine a basic sound effect processing item whose average processing time is less than 15 ms, as an additional sound effect processing item from the set of basic processing items after filtering out the essential sound effect processing items, that is, equalization processing (the average processing time is 8 ms). Therefore, after enabling the essential sound effect processing item, i.e., enabling the mono mode processing item, the display apparatus 200 can also enable the equalization processing item to improve the output sound quality of audio data in an allowed low-latency state.

Figure 14:
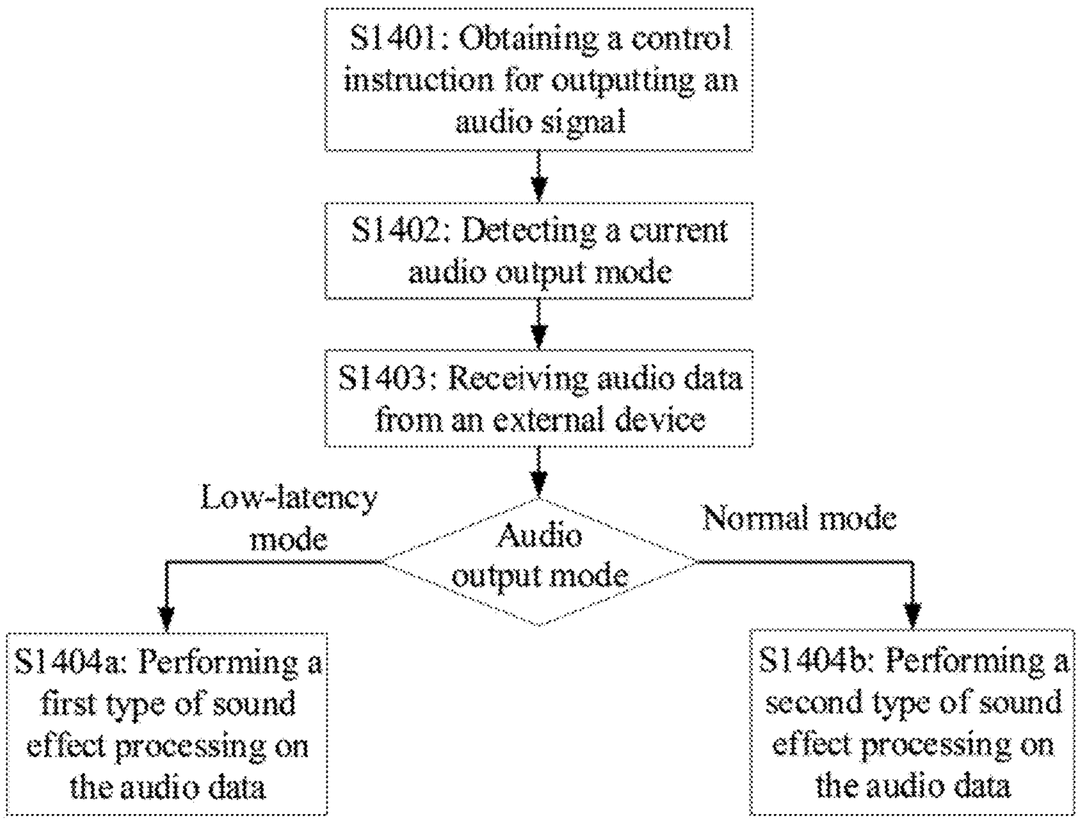
FIG. 14 is a schematic flowchart of a sound effect processing method according to some embodiments of the disclosure.

Based on the above sound effect processing method, a display apparatus 200 is further according to some embodiments of the disclosure. The display apparatus 200 can include: a display 260, an external device interface 240, and a processor(s) 250. The display 260 can be configured to display a user interface. The external device interface 240 can be configured to connect an external device. A schematic flowchart of sound effect processing method in some embodiments of the disclosure is shown in FIG. 14. The processor(s) 250 can be configured to execute instructions to cause the display apparatus 200 to perform:

S1401: obtaining a control instruction for outputting an audio signal;

S1402: detecting a current audio output mode;

S1403: receiving audio data from an external device.

A data format of the audio data is determined by the external device according to the audio output mode; if the audio output mode is a low-latency mode, the flow goes to S1404*a*: performing a first type of sound effect processing on the audio data.

If the audio output mode is a normal mode, the flow goes to S1404*b*: performing a second type of sound effect processing on the audio data.

The control instruction for outputting the audio signal is obtained; in response to the control instruction, the current audio output mode is detected, the audio output mode is the normal mode or the low-latency mode; the audio data from the external device is received, and the data format of the audio data is determined by the external device according to the audio output mode; if the audio output mode is the low-latency mode, the first type of sound effect processing is performed on the audio data; if the audio output mode is the normal mode, the second type of sound effect processing is performed on the audio data, and the processing time of the second type of sound effect processing can be longer than the processing time of the first type of sound effect processing.

The display apparatus 200 according to the above embodiments can detect a current audio output mode after receiving a control instruction for outputting an audio signal, and obtain audio data in different data formats according to the audio output mode. During sound effect processing, if the audio output mode is the low-latency mode, the first type of sound effect processing is performed on the audio data to reduce the sound effect processing time; if the audio output mode is the normal mode, the second type of sound effect processing is performed on the audio data to improve sound effect quality. The display apparatus 200 can reduce the decoding time of audio data by changing the sound encoding format output from the external device. At the same time, by reducing unessential processing items in subsequent sound effect processing links, the sound effect processing time can be reduced, and the sound and image synchronization effect in the low-latency mode can be improved, so as to solve the problem of out-of-synchronization of sound and image.

In view of the above issues, such as long response time and excessive memory requirements, and out-of-synchronization of audio and video, some embodiments of the disclosure also provide an audio playing method, and some steps of the audio playback method can be applied to the display apparatus 200, some steps may be applied to an external device connected to the display apparatus 200. Obviously, the display apparatus 200 and the external device require certain hardware support when implementing the audio playing method. That is, the display apparatus 200 can include a display 260, an external device interface 240 and a processor(s) 250. The external device can include an output module 510 and a processing module 520.

Figure 15:
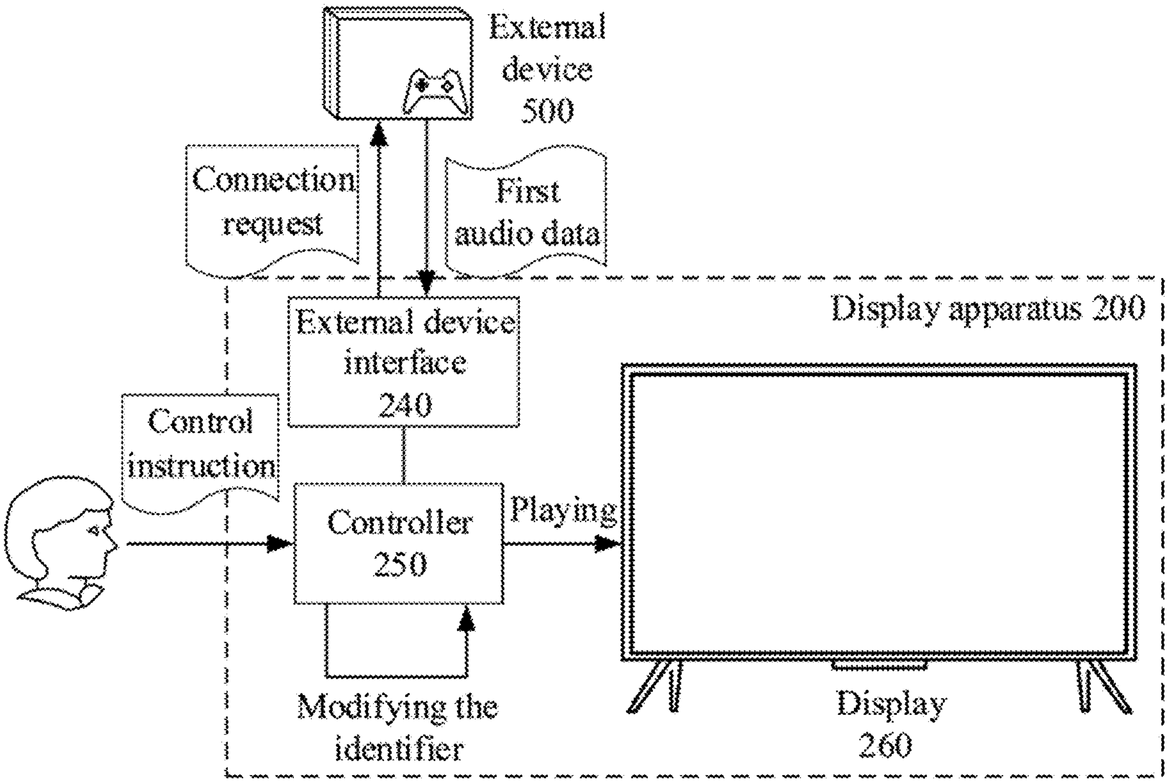
FIG. 15 is a schematic flowchart of an audio output method according to some embodiments of the disclosure.

The display 260 can be used to display one or more images corresponding to audio data sent from an external device through a user interface. The external device interface 240 can be used to connect the output module 510 of the external device to obtain audio and video data. As shown in FIG. 15, the processor(s) 250 and the processing module 520 can be respectively used to the audio playing method, specifically including the following:

obtaining a control instruction for enabling a low-latency mode. The control instruction for enabling the low-latency mode can be actively input from a user, or can be automatically generated by the display apparatus 200 based on a monitoring result of a current operating state. That is, in some embodiments, the display apparatus 200 may obtain the control instruction for enabling the low-latency mode based on an interactive action input from a user. For example, a setting menu interface can be called up through keys on the display apparatus 200 or keys on the control device 100 accompanying the display apparatus 200, and a focus cursor can be controlled on the setting menu interface to move by using direction keys. When the focus cursor is moved to a low-latency mode option and a “confirmation key” is pressed, the low-latency mode of the display apparatus 200 is enabled, and the display apparatus 200 obtains the control instruction for enabling the low-latency mode.

It should be noted that the image low-latency mode and the sound low-latency mode of the display apparatus 200 can be uniformly configured in one mode, that is, the low-latency mode. Then, when the low-latency mode has been enabled or disabled, the display apparatus 200 can enable or disable the image low-latency mode and the sound low-latency mode at the same time. The image low-latency mode and the sound low-latency mode can also be two independent modes, and support users to set them separately. For example, the two low-latency modes can be in different setting menus or interfaces, that is, an image low-latency mode option can be in a lower-level menu of an image setting option, and a sound low-latency mode option can be in a lower-level menu of a sound setting option.

Figure 16:
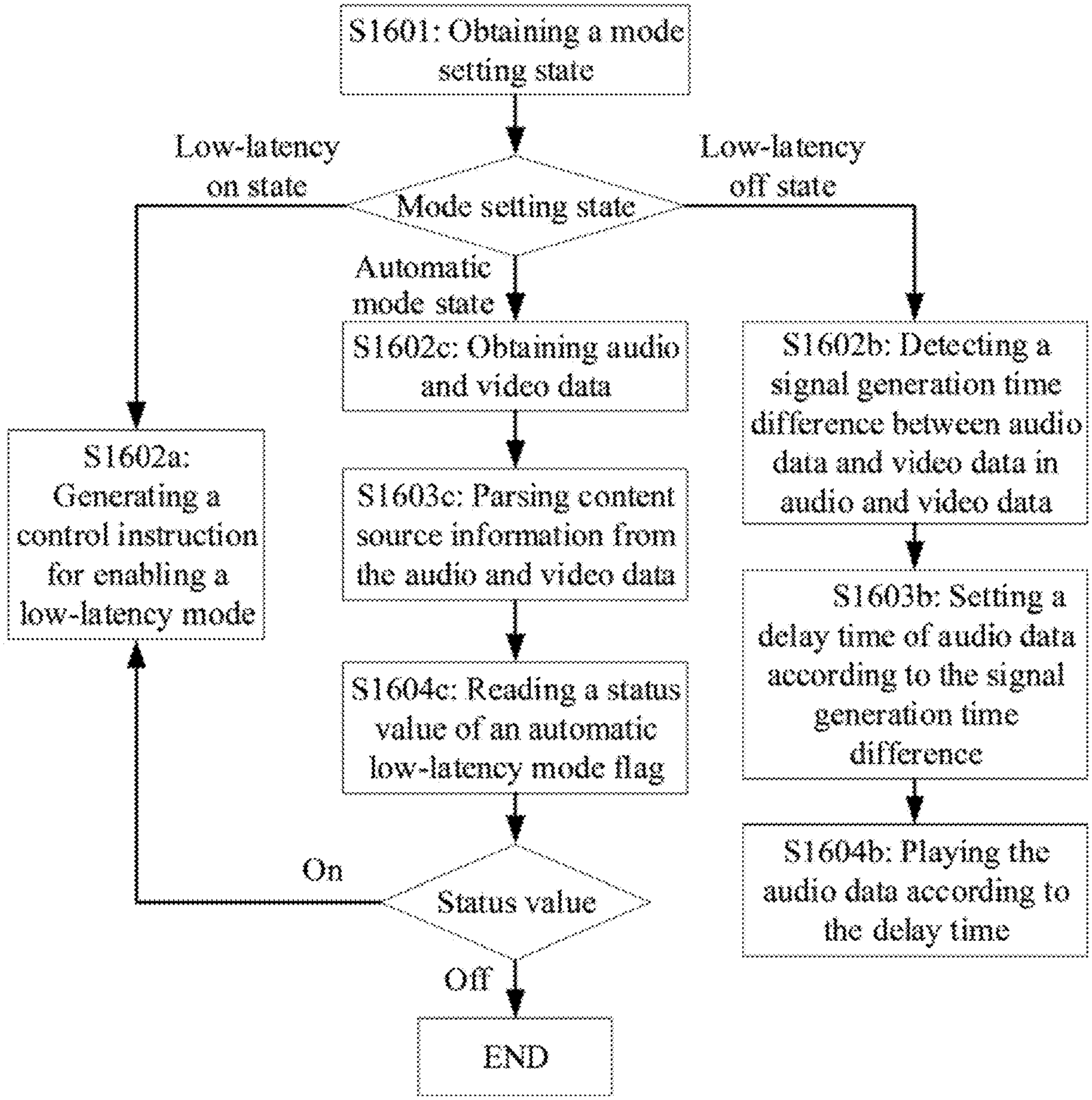
FIG. 16 is a schematic flowchart of generating a control instruction according to a mode setting state according to some embodiments of the disclosure.

As shown in FIG. 16, in some embodiments, the display apparatus 200 may automatically generate a control instruction for enabling a low-latency mode when it is determined that the low-latency mode needs to be enabled based on a current operating state. The display apparatus 200 can obtain a mode setting state during operation, where the mode setting state can include one of a low-latency on state, a low-latency off state, and an automatic mode state. If the mode setting state is low-latency enabled state, the control instruction for enabling the low-latency mode is generated. If the mode setting state is the automatic mode state, the display apparatus 200 can monitor the audio and video data sent from the external device 500 and generate a control instruction based on a monitoring result.

In some embodiments, the display apparatus 200 may first obtain audio and video data, where the audio and video data can include video data, audio data, and content source information. The content source information is informational data content established according to a transmission protocol between the display apparatus 200 and an external device, and can be used to transmit respective operating states and control instructions of the display apparatus 200 and the external device to achieve collaborative control.

Therefore, after obtaining the audio and video data, the display apparatus 200 can parse the content source information from the audio and video data. The content source information can include a flag bit for an automatic low-latency mode. The display apparatus 200 can determine whether a current operating state of an external device requires the display apparatus 200 to enable a low-latency mode by reading a status value of an automatic low-latency mode flag. If the status value is on, a control instruction for enabling a low-latency mode is generated, that is, the display apparatus 200 obtains the control instruction for enabling the low-latency mode.

After obtaining the control instruction for enabling the low-latency mode, the display apparatus 200 may respond to the control instruction to set an identifier of the display apparatus as a first identifier. The identifier can include a first identifier or a second identifier; the first identifier can be used to indicate that the display apparatus supports the first type of sound effect processing; the second identifier can be used to indicate that the display apparatus supports the second type of sound effect processing; and the processing time of the first type of sound effect processing is less than the processing time of the second type of sound effect processing.

For example, when an external device identifies the display apparatus 200 through EDID, identification data corresponding to the EDID can include a parameter bit corresponding to an identifier. The external device can obtain a data processing situation supported by the display apparatus 200 by reading a specific data value on the parameter bit. Here, the identifier used to indicate that the current display apparatus 200 supports low-level sound effect processing such as PCM and LPCM, that is, the identifier of the first type of sound effect processing, is the first identifier; the identifier used to indicate that the current display apparatus 200 supports high-level sound effect processing such as DTS, Dobly, etc., that is, the identifier of the second type of sound effect processing, is the second identifier.

The low-level audio processing such as PCM and LPCM has lower requirements for audio data, for example, it only needs to include a content audio. However, the high-level sound effect processing such as DTS and Dobly has higher requirements for audio data, it is required to include a content related to the audio, as well as an audio related to sound effects such as environmental sound and directional sound, so that the time for the display apparatus 200 to perform high-level sound effect processing on the audio data is longer than the time for low-level sound effect processing, which is not conducive to realizing the low-latency mode. Therefore, in the embodiments, after the low-latency mode is activated, the display apparatus 200 can modify the identification data corresponding to the EDID, so that the specific value of the parameter bit corresponding to the identifier is the first identifier corresponding to the low-level sound effect processing such as PCM and LPCM.

Since the identification data where the identifier such as EDID is located is generally sent to an external device in the form of protocol data, in some embodiments, the display apparatus 200 can extract an initial identification configuration file from the protocol data corresponding to the external device interface 240, that is, extract the file for recording an identifier when it is not modified to the first identifier, during modifying the identifier of the display apparatus to the first identifier, and then the display apparatus 200 can read the identifier content in the initial identification configuration file. If the identifier in the initial identification configuration file is the second identifier, the external device is informed that the current display apparatus 200 supports the high-level sound effect processing, and the external device sends audio data adapted to the high-level sound processing algorithm to the display apparatus 200. In this case, the display apparatus 200 may delete the initial identification configuration file and create an update identification configuration file. Here, the identifier of the update identification configuration file is the first identifier, that is, the external device is informed that the current display apparatus 200 supports the low-level sound effect processing. The update identification configuration file is then added to the protocol data, so that the external device sends audio data adapted to the low-level sound effect processing algorithm to the display apparatus 200.

For example, when the low-latency mode is not enabled and the protocol data sent from the display apparatus 200 to the external device can include protocol data whose identifier can support DTS sound effects, the external device can send audio data corresponding to the DTS sound effects to the display apparatus 200. When the display apparatus 200 detects that the low-latency mode has been initiated, the display apparatus 200 can delete the initial identification configuration file in the protocol data, and then create an update identification configuration file whose identifier can support PCM sound effect processing, so that the external device can send the PCM audio data to the display apparatus 200, thereby reducing the processing time of the audio data by the display apparatus 200.

It should be noted that during the process of deleting the initial identification configuration file, since the external device detects that the current display apparatus 200 can support the low-level sound effect processing, the subsequent audio data sent from the external device to the display apparatus 200 is all audio data corresponding to the low-level sound effect processing. However, if the low-latency mode has been disabled, that is, if high-quality sound effects can be obtained, the identifier needs to be changed back to the second identifier. Based on this, when the display apparatus 200 deletes the initial identification configuration file, the initial identification configuration file can be moved to a backup database for storage, so that when the low-latency mode is subsequently disabled, it can be directly called from the backup database without having to perform device identification detection again, which facilitates the realization of fast mode switching.

After adjusting the identifier to the first identifier, the display apparatus 200 may send a connection request to an external device. The connection request can be used to cause re-establishment of an audio output channel between the display apparatus 200 and the external device, and may have different connection request forms according to an interface mode between the display apparatus 200 and the external device. For example, when the display apparatus 200 and the external device are connected through an HDMI interface, the connection request can be a hot plug connection request. The hot plug connection request is a signal that simulates voltage change when hardware is connected. When an external device can receive the hot plug connection request, it is equivalent to a new device being connected to the external device. At this time, the external device can be caused to read the identifier of the access device, and create a new audio output channel based on the identifier. When the display apparatus 200 and the external device are connected through wireless transmission, the connection request can be an initialization connection request in a corresponding wireless connection mode. The initialization connection request can imitate a first connection state to cause the external device to re-establish a wireless connection with the display apparatus 200 based on a new identifier.

It should be noted that the audio output channel established based on the connection request and an original audio output channel have the same physical channel, but there are differences in the type of data transmission. It can be seen that before the connection request is sent, the physical channel can be used to transmit second audio data, that is, audio data corresponding to the high-level sound effect processing; and after the connection request is sent, the physical channel can be used to transmit first audio data, that is, audio data corresponding to the low-level sound effect processing.

In addition, in the embodiments of the disclosure, the high-level sound effect processing and the low-level sound effect processing are only used to distinguish audio data with different sound effect processing times and do not limit the types of sound effects. Since some relative high-level audio data with short processing time can also be used as low-level audio data for low-level sound effect processing, in order to determine the first audio data and the second audio data, the display apparatus 200 and the external device can have a built-in device information table, the device information table may record sound effect processing methods supported by the display apparatus 200 and audio data types corresponding to various sound effects. Moreover, the sound effect processing time corresponding to various sound effect processing methods can be classified according to a pre-test situation, so that the sound effect processing with a short processing time is the low-level sound effect processing, and the corresponding audio data is the first audio data; and the sound effect processing with a longer processing time is the high-level sound effect processing, and the corresponding audio data is the second audio data.

After an audio output channel is established, an external device can send audio data that conforms to an audio output mode to the display apparatus 200 according to a newly established audio output channel. That is, if the audio output mode is the low-latency mode, the first audio data is sent to the display apparatus; if the audio output mode is the normal mode, the second audio data is sent to the display apparatus.

For example, an external device is a game box, when the display apparatus 200 changes a supported audio processing method to support PCM/LPCM state through EDID and sends a hot plug request to the game box, the game box can first read the EDID and then shake hands with the display apparatus 200, so that the game box can be used as a source terminal, and the game box will change the format of the output audio data to PCM or LPCM according to the request issued by a sync terminal of the display apparatus 200.

Corresponding to an external device sending first audio data through an audio input channel, the display apparatus 200 may receive the first audio data through the audio input channel and play the received first audio data. For the play process of the first audio data, since the sound effect processing time of the first audio data is shorter than the sound effect processing time of the second audio data, the display apparatus 200 decodes the first audio data more efficiently and can output a sound signal in a shorter time, thereby achieving low-latency effect.

The schematic flowchart of generating a control instruction according to a mode setting state shown in FIG. 16 will be described below with a specific embodiment. As shown in FIG. 16, in some embodiments, the display apparatus 200 can execute the following steps based on a current operating state.

It is determined that it needs to be enabled, and if the mode setting state is to enable a low-latency state, a control instruction for enabling the low-latency mode is generated. If the mode setting state is an automatic state, the display apparatus 200 can monitor audio and video data sent from an external device and generate a control instruction based on a monitoring result.

S1601: obtaining a mode setting state. The mode setting state can include one of a low-latency on state, a low-latency off state, and an automatic mode state.

If the mode setting state is the low-latency on state, the flow goes to S1602*a*: generating a control instruction for enabling a low-latency mode.

If the mode setting state is the low-latency off state, the flow goes to:

S1602*b*: detecting a signal generation time difference between audio data and video data in audio and video data;

S1603*b*: setting a delay time of audio data according to the signal generation time difference; and S1604*b*: playing the audio data according to the delay time.

If the mode setting state is the automatic mode state, the flow goes to:

S1602*c*: obtaining audio and video data;

S1603*c*: parsing content source information from the audio and video data; and S1604*c*: reading a status value of an automatic low-latency mode flag.

If the status value is on, the flow goes to S1602*a*.

If the status value is off, the flow goes to end.

It can be seen that in the above embodiments, after the low-latency mode is enabled, the display apparatus 200 can change the format of the audio data received by the display apparatus 200 by modifying the identifier, that is, causing the external device to send the first audio data with a shorter sound effect processing time to the display apparatus 200. By adjusting the format of the data output by the source terminal, the sound effect processing time of the display apparatus 200 can be shortened, so that the display apparatus 200 can output a sound response in a shorter time and realize the sound low-latency function.

Figure 17:
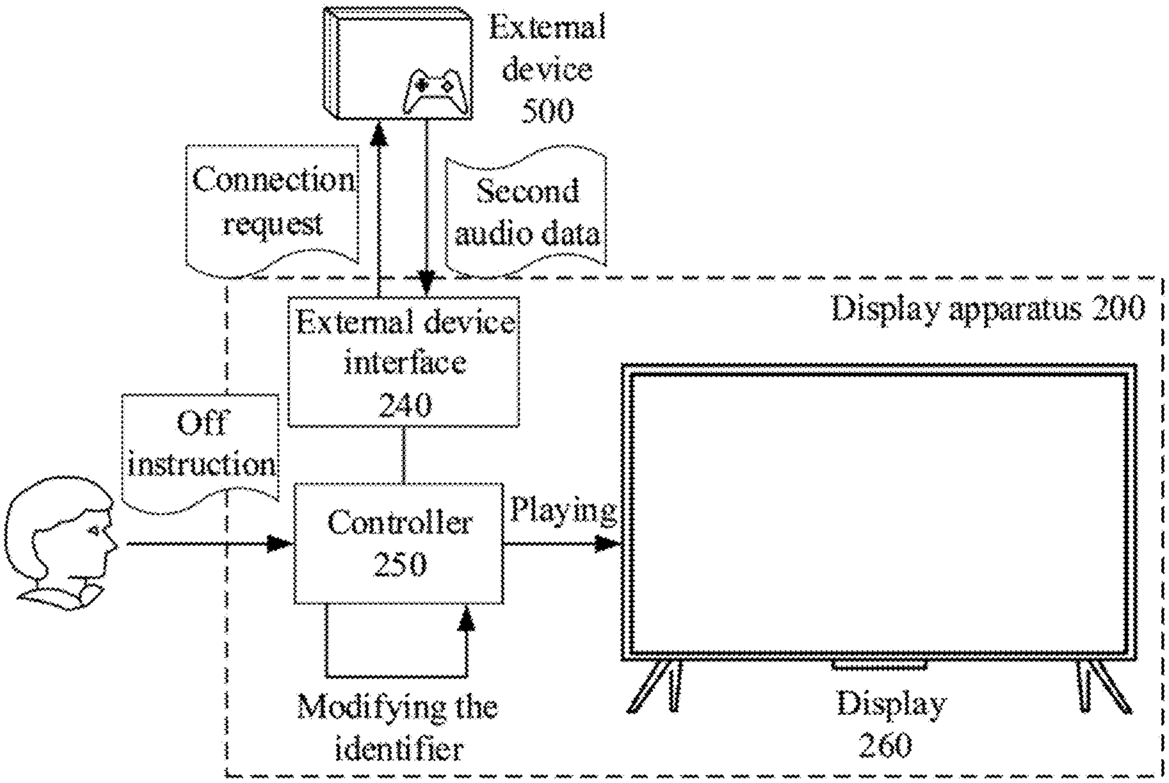
FIG. 17 is a schematic diagram of an audio output process when a low-latency mode is disabled according to some embodiments of the disclosure.

Similarly, when a user can control the display apparatus 200 to switch from the low-latency mode back to the normal mode, the display apparatus 200 also needs to modify the identifier, so that the external device can send audio data or video data having a higher quality to the display apparatus 200, to improve the playing media playing effect. That is, as shown in FIG. 17, in some embodiments, the display apparatus 200 may obtain an off instruction for disabling the low-latency mode. Similar to the control instruction for enabling the low-latency mode, the off instruction can also be manually input from the user, or automatically generated by the display apparatus 200 after detecting the current operating state.

For example, the low-latency mode switch is "off" by default and is linked to an image low-latency mode menu. When the status of the image low-latency switch is set to "on", the display apparatus 200 automatically enables the low-latency mode. When the status of the image low-latency switch is set to "off", the display apparatus 200 automatically disables the low-latency mode, that is, obtains an off instruction.

After obtaining the off instruction, the display apparatus 200 may modify the identifier of the display apparatus 200 to the second identifier in response to the off instruction. That is, the external device is informed that the current display apparatus 200 supports the high-level sound effect processing method, so that the external device can feed back the second audio data to the display apparatus 200 according to the second identifier. Then, the display apparatus 200 can send a connection request to the external device to re-establish the audio output channel, can receive the second audio data sent from the external device through the audio input channel, and play the second audio data.

For example, when the low-latency mode is enabled and the EDID of the display apparatus 200 is identified as supporting the sound effect processing function of PCM, the external device can send audio data in PCM format to the display apparatus 200. After the low-latency mode is disabled, the display apparatus 200 can change the identifier in the EDID to support the DTS sound effect processing function. At this time, the external device will feed back DTS audio data to the display apparatus 200 according to the identifier. After receiving the DTS audio data, the display apparatus 200 performs sound effect processing on the audio data according to the DTS sound effect processing algorithm to obtain high-quality audio output effects.

It should be noted that in the above embodiments, the display apparatus 200 may be a television, an audio-visual integrated display, a mobile phone, a smart screen, etc., with a built-in speaker or other audio output devices. For some display apparatuses 200, due to limitations of their hardware configuration, no built-in audio output device is included, that is, the display apparatuses 200 themselves do not output sound. Therefore, in order to output sound, in some embodiments, an audio playing device can be connected through the external device interface 240 or the audio output interface 270. For example, the display apparatus 200 can connect with an acoustic device through a USB interface (external device interface 240), or an AV interface (audio output interface 270), or a Bluetooth connection module (computing device 220), and send the sound signal to the acoustic device when the sound needs to be output, to output the sound through the acoustic device.

Figure 18:
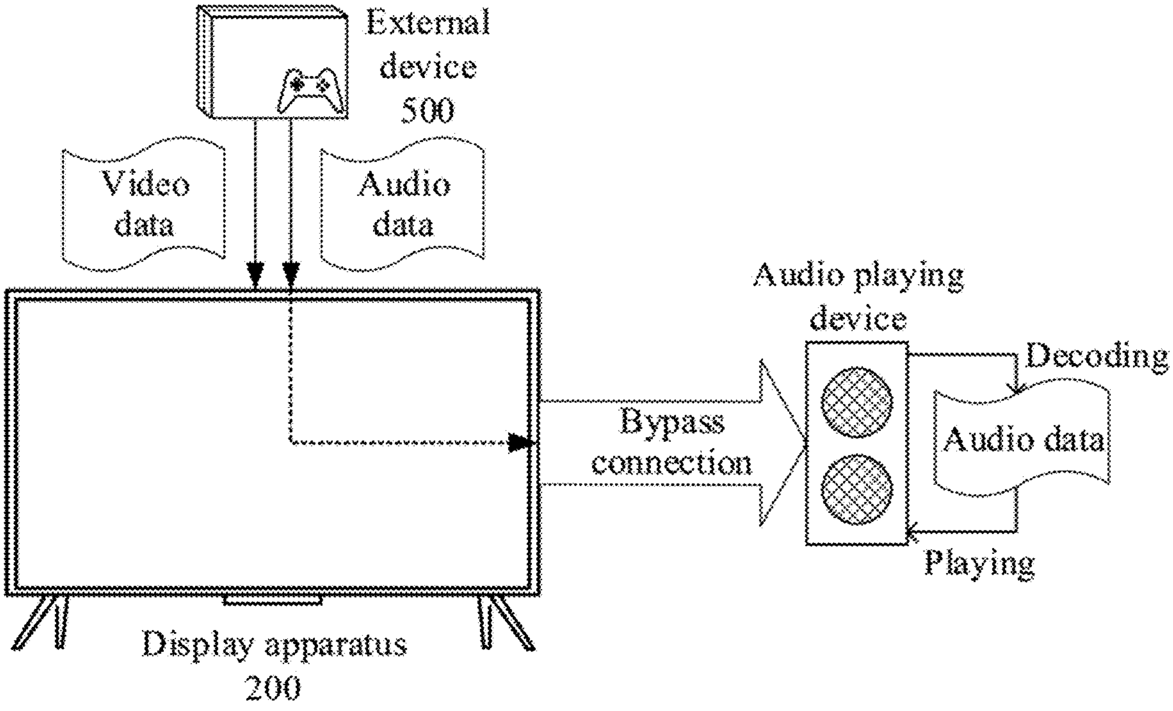
FIG. 18 is a schematic flowchart of outputting audio through an external audio playing device according to some embodiments of the disclosure.

As shown in FIG. 18, for the display apparatus 200 that performs sound output through a peripheral device, audio data sent from an external device can also be directly transferred to an audio output device by constructing an audio bypass, so as to perform decoding and sound effect processing on the first audio data. That is, after obtaining the first audio data sent from the external device, the display apparatus 200 detects whether an audio playing device is currently connected to the external device interface 240, the audio output interface 270, and the computing device 220. If an audio playing device is connected to the above components, the display apparatus 200 can construct an audio bypass for transmitting the first audio data, and forward the received first audio data to the audio playing device in a bypass manner, so as to cause the audio playing device to decode the first audio data.

For example, after the display apparatus 200 modifies an EDID to support PCM sound effects, a game box can feed back audio data in PCM format to the display apparatus 200 based on the EDID. The display apparatus 200 then detects an access state of a USB interface. When the USB interface is connected with an acoustic device, audio data in PCM format can be transmitted to the acoustic device in a bypass manner. After receiving audio data in PCM format, the acoustic device decodes audio data and converts the audio data into a sound signal for output. When the USB interface is not connected to an acoustic device, the display apparatus 200 can decode the received audio data through a decoding program, thereby converting it into a sound signal for output from a local speaker of the display apparatus 200.

It can be seen that in the above embodiments, when the display apparatus 200 outputs a sound signal through an external device, the display apparatus 200 can change the sound processing link after the low-latency mode is enabled. That is, the display apparatus 200 sends audio data to an audio playing device in a bypass manner for decoding, so that the audio data can reach the external device as soon as possible, thereby reducing the playing delay and achieving the effect of synchronous output of image and sound.

Similarly, when the display apparatus 200 can be controlled to disable the low-latency mode, the display apparatus 200 can traverse devices connected to the external device interface 240 when playing the second audio data. If the external device interface 240 is connected with an audio playing device, the audio bypass is closed, and audio decoding is performed on the second audio data to generate an audio signal, and an audio signal is sent to an audio playing device to play the audio signal through the audio playing device.

That is, when the low-latency mode is not enabled, audio data sent from the external device is still decoded and sound effect processed by the display apparatus 200 to utilize the better sound processing function of the display apparatus 200 to obtain higher-quality sound effects and improve user experience. Moreover, hardware configuration requirements of the audio playing device connected with the display apparatus 200 can be lowered, thereby improving product promotion rate.

Since the format of audio data received by the display apparatus 200 will change when the low-latency mode is switched, and when the audio format is switched, the display apparatus 200 will have burst sound at the moment of switching the audio signal, which reduces user experience. For this reason, in some embodiments, the display apparatus 200 can also enable a mute mode when switching the mode. That is, the display apparatus 200 can enable on the mute mode before modifying the identifier of the display apparatus to the first identifier, monitor the decoding process in real time when the display apparatus 200 decodes the first audio data, and disable the mute mode when it detects that the decoding of the display apparatus 200 is completed, so as to continue outputting sound signals.

For the case where the display apparatus 200 plays a sound signal through a peripheral device, the display apparatus 200 may receive a decoding success signal fed back by an audio playing device after sending the first audio data to the audio playing device. When the audio playing device feeds back the decoding success signal, the display apparatus 200 can disable the mute mode to continue outputting sound through the audio playing device.

For example, when the low-latency mode or the game mode is enabled, the display apparatus 200 will first enable the mute mode to mute the entire apparatus to prevent burst sound when the mode is switched, and then delete the original local EDID and generate a new EDID, and initiate a hot plug request, so that the game box connected through the HDMI interface can send PCM/LPCM data according to the current EDID after receiving the request. The display apparatus 200 determines whether each interface is currently connected with a sound peripheral audio, and then directly sends the audio data sent from the game box that is cached in the display apparatus 200 to the peripheral audio in the bypass manner if there is a peripheral audio connected, and detects the feedback signal that the HDMI signal analysis is stable. When the display apparatus 200 can receive an instruction that the HDMI signal analysis is stable, the display apparatus 200 initiates an unmute instruction to disable the mute mode. So far, the process of enabling the low-latency mode or the game mode is completed.

Similarly, when the display apparatus 200 disables the low-latency mode, the problem of burst sounds is also likely to occur. Therefore, the display apparatus 200 can also enable the mute mode after obtaining an off instruction, and enable the mute mode after the signal analysis is stable. For example, when the display apparatus 200 can be controlled to disable the low-latency mode or disable the game mode, the display apparatus 200 needs to first enable the mute mode to mute the entire apparatus and prevent burst sound when switching the mode, and then to delete the local EDID that supports LPCM/PCM, and to extract device information of the display apparatus 200 from the data backup to generate a new EDID. The new EDID supports high-level sound effects processing such as Dobly and DTS. The display apparatus 200 further initiates a hot plug request, so that after receiving the request, the game box sends the corresponding audio data according to the current EDID. At the same time, the display apparatus 200 further determines whether a sound peripheral device is connected. If the peripheral device is connected, audio bypass is disabled, so that the system on chip (SOC) of the display apparatus 200 resumes decoding, encoding and sound effect processing, and then sends data to a peripheral device for sound output. The display apparatus 200 can further detect an instruction that HDMI signal analysis is stable, and initiate an unmute instruction to disable the mute mode after receiving the instruction that the HDMI signal analysis is stable. At this point, the process of disabling low-latency mode or game mode is completed.

In the above embodiments, the display apparatus 200 realizes an image low-latency function by disabling an unessential image quality processing, and realizes a sound low-latency function by adjusting a format of output data of a source terminal, and/or changing a sound processing link. The implementation of the low-latency function according to the above embodiments can shorten the processing time of image and sound data in the display apparatus 200, so that the delay of image and sound output by the display apparatus 200 can be controlled within a range of less than or equal to 16 ms.

In some embodiments, when a user does not pay attention to the delay of the image and sound, that is, the low-latency mode is disabled, the display apparatus 200 can also detect a signal generation time difference between audio data and video data in the audio and video data, and set the delay time of the audio data according to the signal generation time difference, so as to play audio data according to the delay time.

For example, the display apparatus 200 can detect time T1 when a video signal is formed and time T2 when a sound signal is formed after decoding in the normal mode, and then calculate a difference ΔT between the times for forming the two signals, that is, A T=|T2−T1|, and then determine the time difference ΔT. When the time difference is greater than or equal to a synchronization threshold T0, that is, when ΔT≥T0, it is determined that the current image and sound are out of synchronization. Therefore, the delay time of the audio data can be set according to the signal generation time difference ΔT, that is, the audio signal can be played in advance or delay by ΔT to achieve synchronization with the image. In addition, when the time difference is less than the synchronization threshold T0, that is, when ΔT<T0, it is determined that the current playing difference between the sound and the image is within a reasonable range, and there is no problem of out-of-synchronization of the sound and image, then the display apparatus 200 can meet user's needs in accordance with the normal way of playing the sound and image.

Figure 19:
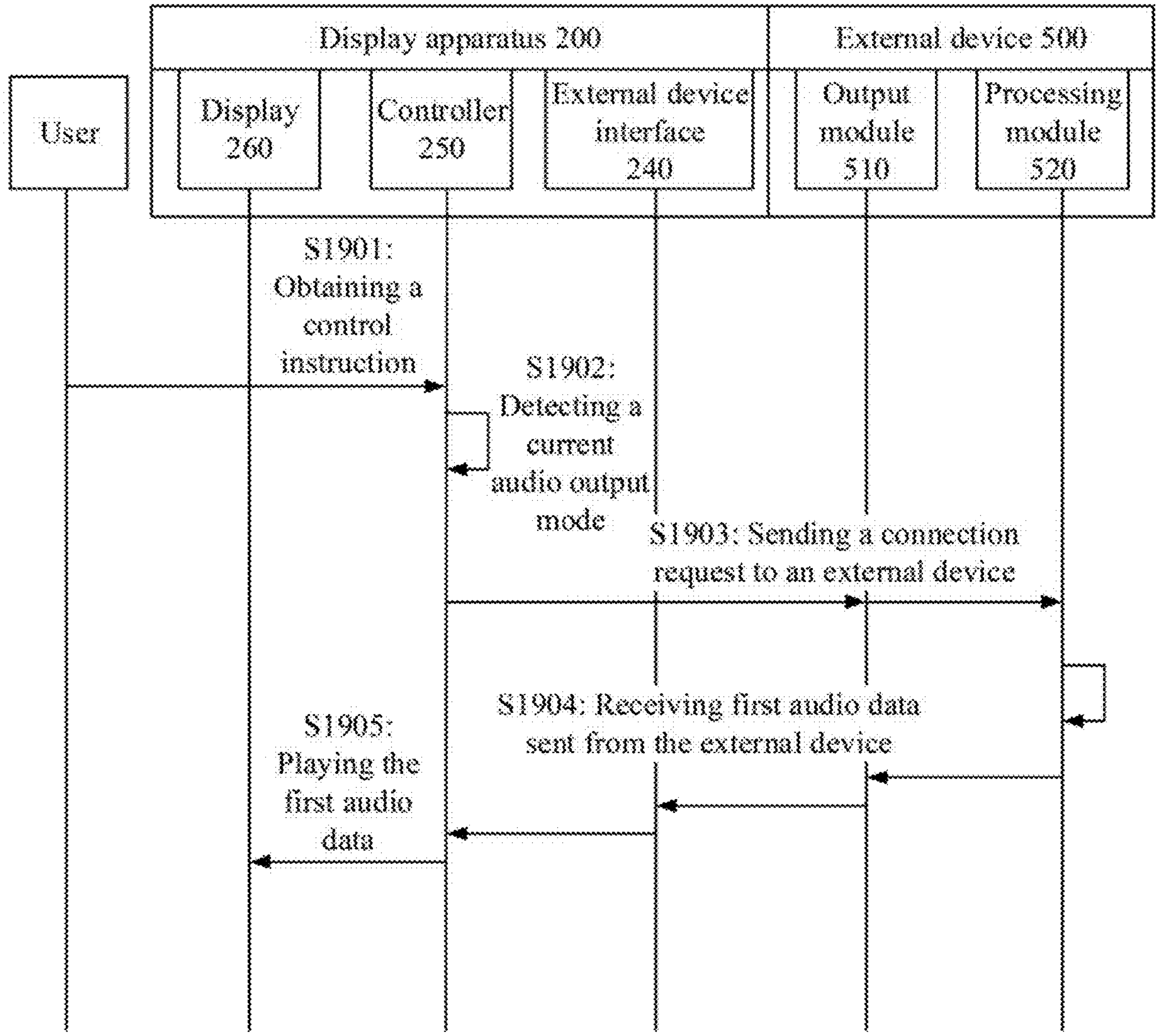
FIG. 19 is a timing diagram of an output audio signal according to some embodiments of the disclosure.

Based on the audio playing method according to the above embodiments, a display apparatus 200 is also according to some embodiments of the disclosure. As shown in a timing diagram of output audio signals in FIG. 19, the display apparatus 200 can include: a display 260 and a processor(s) 250. The display 260 can be configured to display a user interface and a video image sent from an external device; one or more external device interface can be configured to connect to the external device; and the processor(s) 250 can be configured to execute instructions to cause the display apparatus 200 to perform the following steps.

S1901: obtaining a control instruction.

S1902: detecting a current audio output mode.

S1903: sending a connection request to an external device.

If the audio output mode is a low-latency mode, the flow goes to:

S1904: receiving, by the display apparatus 200, first audio data sent from the external device.

The external device can include: an output module 510 and a processing module 520. The output module 510 can be configured to connect with the display apparatus 200 to send audio and video data to the display apparatus 200; the processing module 520 can be configured to: determine a data format of audio data according to an audio output mode of the display apparatus 200, and send the audio data in the data format to the output module 510, that is, sending first audio data to the output module 510. The output module 510 sends the first audio data to the display apparatus 200.

S1905: playing, by the display apparatus 200, the first audio data.

A control instruction for enabling a low-latency mode is obtained.

In response to the control instruction, an identifier of the display apparatus is modified to a first identifier; the identifier can include a first identifier or a second identifier; the first identifier can be used to indicate that the display apparatus supports first audio decoding, i.e., a first type of sound effect processing function; the second identifier can be used to indicate that the display apparatus supports second audio decoding, that is, a second type of sound effect processing function; and the time for performing the first type of sound effect processing is shorter than the time for performing the second type of sound effect processing.

A connection request is sent to the external device to establish an audio input channel.

If the audio output mode is a low-latency mode, first audio data sent from the external device is received through an audio input channel, and the first audio data is played.

In conjunction with the above display apparatus 200, an external device is also according to some embodiments of the disclosure. The external device can include: an output module 510 and a processing module 520. Here, the output module 510 can be configured to connect to the display apparatus 200 to send audio and video data to the display apparatus 200; and the processing module 520 can be configured to:

determine a data format of audio data according to an audio output mode of the display apparatus, and send the audio data in the data format to the output module 510.

For the convenience of explanation, the above description has been made in combination with the specific embodiments. The above exemplary discussion is not intended to be exhaustive or to limit the embodiments to the specific forms disclosed above. According to the above teachings, various modifications and deformations can be obtained. The selection and description of the above embodiments are to better explain the principles and practical applications, such that those skilled in the art better use the embodiments and various variant embodiments suitable for specific use considerations.

What is claimed is:

1. A display apparatus, comprising:

a display configured to display an image and/or a user interface;

one or more external device interfaces, configured to connect with one or more external devices;

one or more processors in connection with the display and the one or more external device interfaces, and configured to execute instructions to cause the display apparatus to:

obtain a control instruction for outputting an audio signal;

in response to the control instruction, detect a current audio output mode of the display apparatus, wherein the audio output mode comprises a normal mode and/or a low-latency mode;

receive audio data from a first external device in connection with the display apparatus via an external device interface; wherein a data format of the audio data is determined according to the audio output mode;

based on that the audio output mode is the low-latency mode, perform a first type of sound effect processing on the audio data; and based on that the audio output mode is the normal mode, perform a second type of sound effect processing on the audio data; wherein processing time of the second type of sound effect processing is greater than processing time of the first type of sound effect processing, wherein the one or more processors are further configured to execute instructions to cause the display apparatus to:

obtain a detection result of the audio output mode;

based on that the audio output mode is the low-latency mode, set a first identifier, wherein the first identifier is configured to cause a second external device to send first audio data;

send the first identifier to the second external device; and receive the first audio data sent from the second external device according to the first identifier.

2. The display apparatus according to claim 1, wherein the one or more processors are further configured to execute instructions to cause the display apparatus to:

obtain a sound low-latency switch state, wherein the sound low-latency switch state comprises one of an on-state, an off-state, or an automatic state;

base on that the sound low-latency switch state is the on-state, mark the audio output mode as the low-latency mode;

based on that the sound low-latency switch state is the off-state, mark the audio output mode as the normal mode;

based on that the sound low-latency switch state is the automatic state, obtain a status of an image low-latency switch in the display apparatus, and set the current audio output mode according to the status of the image low-latency switch.

3. The display apparatus according to claim 2, wherein the one or more processors are further configured to execute instructions to cause the display apparatus to:

based on that the status of the image low-latency switch is an automatic state, obtain audio and video data sent from the first external device;

extract content source information from the audio and video data, wherein the content source information comprises an automatic low-latency mode flag;

read a status value of the automatic low-latency mode flag, wherein the status value is set by the first external device according to output requirements of current audio and video data;

based on that the status value is on, mark the audio output mode as the low-latency mode; and based on that the status value is off, mark the audio output mode as the normal mode.

4. The display apparatus according to claim 3, wherein the one or more processors are further configured to execute instructions to cause the display apparatus to:

based on that the mode is a normal mode, detect a signal generation time difference between audio data and video data in the audio and video data;

set a delay time of the audio data according to the signal generation time difference; and play the audio data according to the delay time.

5. The display apparatus according to claim 1, wherein the one or more processors are further configured to execute instructions to cause the display apparatus to:

based on that the audio output mode is the normal mode, set a second identifier, wherein the second identifier is configured to cause the second external device to send second audio data, and sound effect processing time of the second audio data is longer than sound effect processing time of the first audio data;

send the second identifier to the second external device; and receive the second audio data sent from the second external device according to the second identifier.

6. The display apparatus according to claim 5, wherein the one or more processors are further configured to execute instructions to cause the display apparatus to:

send a connection request to the second external device to re-establish an audio input channel;

based on that the audio output mode is the normal mode, receive second audio data sent from the second external device through the audio input channel, and play the second audio data.

7. The display apparatus according to claim 6, wherein the one or more processors are further configured to execute instructions to cause the display apparatus to:

traverse one or more devices connected via an external device interface corresponding to the second external device;

based on that an audio playing device is connected, close the audio bypass;

perform audio decoding on the second audio data to generate an audio signal; and send the audio signal to the audio playing device to play the audio signal through the audio playing device.

8. The display apparatus according to claim 1, wherein the one or more processors are further configured to execute instructions to cause the display apparatus to:

obtain a set of basic processing items currently supported by the display apparatus, wherein a sound effect processing item in the set of basic processing items is a sound effect processing item of the first type of sound effect processing;

parse the audio data to obtain a current format version of the audio data;

filter out an essential sound effect processing item of the current format version from the set of basic processing items; and call a sound effect processing algorithm corresponding to the essential sound effect processing item, to perform sound effect processing on the audio data by using the sound effect processing algorithm corresponding to the essential sound effect processing item.

9. The display apparatus according to claim 8, wherein the one or more processors are further configured to execute instructions to cause the display apparatus to:

obtain the content source information sent from a third external device, after obtaining the set of basic processing items currently supported by the display apparatus;

read a current content source type of the third external device from the content source information;

filter out an unessential sound effect processing item from the set of basic processing items according to the current content source type; and disable a sound effect processing algorithm corresponding to the unessential sound effect processing item.

10. The display apparatus according to claim 8, wherein the one or more processors are further configured to execute instructions to cause the display apparatus to:

obtain an average processing duration of each sound effect processing item in the set of basic processing items after obtaining the set of basic processing items currently supported by the display apparatus;

filter out an additional sound effect processing item from the set of basic processing items, wherein the additional sound effect processing item is a sound effect processing item whose average processing duration is less than or equal to a remaining duration threshold, wherein the remaining duration threshold is calculated based on a total duration of an essential processing item and a preset allowable delay; and call a sound effect processing algorithm corresponding to the additional sound effect processing item, to perform sound effect processing on the audio data by using the sound effect processing algorithm corresponding to the additional sound effect processing item.

11. The display apparatus according to claim 1, wherein the one or more processors are further configured to execute instructions to cause the display apparatus to:

decode the audio data to obtain an audio signal;

call a basic sound effect processing algorithm, and adjust the audio signal according to the basic sound effect processing algorithm; and play the adjusted audio signal.

12. The display apparatus according to claim 1, wherein the one or more processors are further configured to execute instructions to cause the display apparatus to:

send a connection request to the second external device to establish an audio input channel; and based on that the audio output mode is the low-latency mode, receive the first audio data sent from the second external device through the audio input channel, and play the first audio data.

13. The display apparatus according to claim 1, wherein the external device interface is further configured to connect an audio playing device, and the one or more processors are further configured to execute instructions to cause the display apparatus to:

enable a mute mode before setting an identifier of the display apparatus as the first identifier;

send the first audio data to the audio playing device through an audio bypass, to cause the audio playing device to decode the first audio data; and receive a decoding success signal fed back from the audio playing device, and, close the mute mode in response to the decoding success signal.

14. The display apparatus according to claim 1, wherein the one or more processors are further configured to execute instructions to cause the display apparatus to:

extract an initial identification configuration file from protocol data of the external device interface;

based on that an identifier in the initial identification configuration file is not the first identifier, delete the initial identification configuration file;

create an updated identification configuration file, wherein an identifier of the updated identification configuration file is the first identifier; and add the updated identification configuration file to the protocol data.

15. A sound processing method for a display apparatus, comprising:

obtaining a control instruction for outputting an audio signal;

in response to the control instruction, detecting a current audio output mode, wherein the audio output mode comprises a normal mode and/or a low-latency mode;

receiving audio data from a first external device in connection with the display apparatus via an external device interface, wherein a data format of the audio data is determined according to the audio output mode;

based on that the audio output mode is the low-latency mode, performing a first type of sound effect processing on the audio data; and based on that the audio output mode is the normal mode, performing a second type of sound effect processing on the audio data; wherein processing time of the second type of sound effect processing is greater than processing time of the first type of sound effect processing,
wherein the method further comprises:
obtaining a detection result of the audio output mode;
based on that the audio output mode is the low-latency mode, setting a first identifier, wherein the first identifier is configured to cause a second external device to send first audio data;
sending the first identifier to the second external device; and
receiving the first audio data sent from the second external device according to the first identifier.

16. The method according to claim 15, further comprising:
obtaining a sound low-latency switch state in the display apparatus, wherein the sound low-latency switch state comprises one of an on-state, an off-state, or an automatic state;
base on that the sound low-latency switch state is the on-state, marking the audio output mode as the low-latency mode;
based on that the sound low-latency switch state is the off-state, marking the audio output mode as the normal mode; and
based on that the sound low-latency switch state is the automatic state, obtaining a status of an image low-latency switch, and set the current audio output mode according to the status of the image low-latency switch.

17. The method according to claim 16, further comprising:
based on that the status of the image low-latency switch is the automatic state, obtaining audio and video data sent from the first external device;
extracting content source information from the audio and video data, wherein the content source information comprises an automatic low-latency mode flag;
reading a status value of the automatic low-latency mode flag, wherein the status value is set by the first external device according to output requirements of current audio and video data;
based on that the status value is on, marking the audio output mode as the low-latency mode; and
based on that the status value is off, marking the audio output mode as the normal mode.

18. The method according to claim 15, further comprising:
based on that the audio output mode is the normal mode, setting a second identifier, wherein the second identifier is configured to cause the second external device to send second audio data, and sound effect processing time of the second audio data is longer than sound effect processing time of the first audio data;
sending the second identifier to the second external device; and
receiving the second audio data sent from the second external device according to the second identifier.

* * * * *